United States Patent [19]
Kumashiro

[11] Patent Number: 6,154,717
[45] Date of Patent: Nov. 28, 2000

[54] COMPUTER SIMULATION METHOD OF IMPURITY WITH PILEUP PHENOMENON

[75] Inventor: Shigetaka Kumashiro, Tokyo, Japan

[73] Assignee: NEC Corporation, Tokyo, Japan

[21] Appl. No.: 09/187,739

[22] Filed: Nov. 9, 1998

[30] Foreign Application Priority Data

Nov. 7, 1997  [JP]  Japan ................................. 9/305605

[51] Int. Cl.⁷ .................................................. G06F 17/10
[52] U.S. Cl. ..................................... 703/2; 703/5; 716/20
[58] Field of Search ................................ 703/2, 4, 5, 13; 716/20, 7; 438/451, 530; 250/396 R; 257/192

[56] References Cited

U.S. PATENT DOCUMENTS

| | | | |
|---|---|---|---|
| 4,728,619 | 3/1988 | Pfiester et al. | 438/451 |
| 5,293,045 | 3/1994 | Miyoshi et al. | 250/396 R |
| 5,548,138 | 8/1996 | Tanimoto et al. | 257/192 |
| 5,670,391 | 9/1997 | Lim et al. | 438/530 |

OTHER PUBLICATIONS

H. Sakamoto et al., A New Diffusion Algorithm During Oxidation which can Handle Both Phosphorus Pilu–Up and Boron Segregation at Si–SiO/sub2/ Interface, 1997 International Conference on Simulation of Semiconductor Processes and Devices, SISPAD '97, pp. 81–84.

J. Lee et al., Three–Dimensional Modeling of the TED due to Implantation Damage, 1997 International Conference on Simulation of Semiconductor Processes and Devices, SISPAD '97, pp. 301–303.

S. Chaudhrya et al., Suppression of Reverse Short Channel Effect by High Energy Implantation, Electron Devices Meeting, 1997, Technical Digest, pp. 679–682.

D. Meglio et al., Analysis and Optimization of InGaAsP Electro–Absorption Modulators, IEEE Journal of Quantum Electronics, vol. 31, No. 2, Feb. 1995, 261–268.

H. Soleimani, An Investigation of Phosphorous Transient Diffusion in Silicon Below the Solid Solubility Limit and at a Low Implant Energy, Journal of the Electrochemical Society, vol. 141, No. 8, Aug. 1994, pp. 2182–2188.

R. Dan, "Process and Device Simulation Techniques", published in 1987, pp. 26–45 and 91–134.

S.A. Schwartz et al., "High resolution Auger sputter profiling study of the effect of phosphorus pileup on the Si–SiO2 interface morphology", Journal of Vacuum Science and Technology, vol. 15, No. 2, Mar./Apr. 1978, pp. 227–230.

(List continued on next page.)

*Primary Examiner*—Eric W. Stamber
*Assistant Examiner*—Russell W. Frejd
*Attorney, Agent, or Firm*—Sughrue, Mion, Zinn, Macpeak & Seas, PLLC

[57] ABSTRACT

A simulation method is provided, which makes it possible to simulate diffusion of doped impurity in Si and $SiO_2$ in consideration of the pileup phenomenon of the doped impurity without using any intermediate layer. In the step (a), a mesh having mesh points is configured on a simulated zone including a $SiO_2$ region and a Si region contracted therewith, thereby partitioning the simulated zone into domains. A first one of the mesh points is located in a $SiO_2$ region. A second one of the mesh points is located in a Si region. A third one of the mesh points is located at an interface of the $SiO_2$ and Si regions. The third one of the mesh points serves as a double mesh point having first and second impurity concentrations. The first impurity concentration represents a general impurity concentration of a first one of the domains located in the $SiO_2$ region and adjacent to the interface of the $SiO_2$ and Si regions. The second impurity concentration represents a general impurity concentration of a second one of the domains located in the Si region and adjacent to the interface of the $SiO_2$ and Si regions. In the step (b), diffusion equations are provided at the respective mesh points in such a way that the doped impurity piles up in the first one of the domains located in the $SiO_2$ region. In the step (c), the diffusion equations are solved.

20 Claims, 12 Drawing Sheets

OTHER PUBLICATIONS

M. Orlowski, "New model for dopant redistribution at interfaces", Applied Physics Letters, vol. 55, No. 17, Oct. 1989, pp. 1762–1764.

H. Koike et al., "Semiconductor Device Design Simulator", (Supercomputing Technology), published in 1991, pp. 127–129 and pp. 191–196.

Y. Sato et al., "Arsenic Pileup at the SiO2/Si Interface", Journal of Electrochemical Society, vol. 142, No. 2, Feb. 1995, pp. 655–660.

COMPUTER SIMULATION METHOD OF IMPURITY WITH PILEUP PHENOMENON

BACKGROUND OF THE INVENTION

1. Field of the Invention

The present invention relates to a process simulation method using a computer system applicable to semiconductor device fabrication and more particularly, to a computer simulation method of diffusion of an impurity or dopant in a silicon (Si) region and a silicon dioxide ($SiO_2$) region contacted therewith, in which the pileup phenomenon of the dopant occurring at the interface between the Si and $SiO_2$ regions is considered.

2. Description of the Prior Art

In computer simulation of two-dimensional thermal oxidation of impurity or dopant atoms in Si, which is a typical one of the processes for semiconductor device fabrication, it is popular that a mesh or grid is defined on a zone to be analyzed or simulated (i.e., analyzed or simulated zone), thereby partitioning the analyzed zone into small domains. This is disclosed in, for example, a book entitled "Process and Device Simulation Techniques", written and edited by R. Dan, pp. 26–28, published in 1987.

To numerically solve the well-known diffusion equation in the analyzed or simulated zone, difference equations are provided at individual nodes (i.e., mesh points) of the mesh thus defined for discretization and linearization of the diffusion equation. Thus, a set of simultaneous linear equations describing the two-dimensional thermal diffusion are obtained. By solving the set of simultaneous linear equations thus obtained, the diffusion equation is numerically solved and as a result, the thermal diffusion of the dopant in the Si and $SiO_2$ regions is simulated.

On the other hand, it has been well known that phosphorus (P) and arsenic (As) pile up at the interface of $SiO_2$ and Si when phosphorus-doped Si is oxidized or a composite layer of $SiO_2$ and phosphorus-doped Si is annealed. For example, a fact that the pileup phenomenon of doped phosphorus (P) occurs at the $Si/SiO_2$ interface during its thermal diffusion process was reported by S. A. Schwarz et al. in an article, Journal of Vacuum Science and Technology, Vol. 15, No. 2, pp. 227–230, March/April 1978, entitled "High resolution Auger sputter profiling study of the effect of phosphorus pileup on the $Si/SiO_2$ interface morphology".

A computer simulation method or simulation model of this pileup phenomenon of phosphorus was reported by M. Orlowsky in an article, Applied Physics Letters, Vol. 55, No. 17 pp. 1762–1764, October 1989, entitled "New model for dopant redistribution at interfaces". This conventional simulation method of the phosphorus pileup is explained below with reference to FIGS. 1 and 2, in which this method is explained one-dimensionally for simplification of description.

With the conventional simulation method reported by M. Orlowsky, as shown in FIG. 1, an interface layer is considered as a third phase (i.e., inter-phase) 3 in addition to first and second bulk phases 1 and 2 of $SiO_2$ and Si. It is supposed that a pileup phenomenon of a doped impurity (i.e., phosphorus) occurs in the inter-phase 3 between the $SiO_2$ bulk phase 1 and the Si bulk phase 2.

The diffusion and pileup phenomena of the doped phosphorus atoms are expressed by the following diffusions equation (1)

$$\frac{\partial \vec{C}}{\partial t} = \mathrm{div}\vec{F} \qquad (1)$$

where $\vec{C}$ is the concentration of the dopant or phosphorus atoms and $\vec{F}$ is a diffusion flux. The diffusion flux $\vec{F}$ has different expressions in the $SiO_2$ bulk phase 1, the Si bulk phase 2, and the inter-phase 3, respectively.

As seen from the expression (1), the diffusion equation is a partial differential equation. Therefore, typically, it is difficult or unable to be solved analytically. Thus, the analyzed or simulated zone is partitioned by a mesh into small domains and then, the diffusion equation (1) is converted to a set of simultaneous linear equations including the dopant concentrations at the individual mesh points as variables. By solving the set of simultaneous linear equations, the diffusion equation (1) is numerically solved.

In FIG. 1, reference symbols O1, O2, and O3 denote mesh points defined in the $SiO_2$ bulk phase 1, S1, S2, and S3 denote mesh ponits defined in the Si bulk phase 2, and I denotes a mesh point defined in the inter-phase 3. These mesh points O1, O2, O3, S1, S2, S3, and I are arranged along a straight reference line 4 perpendicular to the inter-phase 3. Reference symbols $d_{O23}$, $d_{O12}$, $d_{OI}$, $d_{IS}$, $D_{S12}$, and $d_{S23}$ denote inter-point distances between the adjoining mesh points O2 and O3, O1 and O2, O1 and I, I and S1, S1 and S2, and S2 and S3, respectively.

The domains of the simulated zone represented by the corresponding mesh points O3, O2, O1, I, S1, S2, and S3 are defined by perpendicular bisectors $M_{O23}$, $M_{O12}$, $M_{OI}$, $M_{IS}$, $M_{S12}$, and $M_{S23}$ with respect to the reference line 4, respectively. These domains are typically termed the "control volumes".

The control volume defined by the bisector $M_{O23}$ and an adjoining, unillustrated bisector is referred as $V_{O3}$. The control volume defined by the bisectors $M_{O23}$ and $M_{O12}$ is referred as $V_{O2}$. The control volume defined by the bisectors $M_{O12}$ and $M_{OI}$ is referred as $V_{O1}$. The control volume defined by the bisectors $M_{OI}$ and $M_{IS}$ is referred as $V_I$. The control volume defined by the bisectors $M_{IS}$ and $M_{S12}$ is referred as $V_{S1}$. The control volume defined by the bisectors $M_{S12}$ and $M_{S23}$ is referred as $V_{S2}$. The control volume defined by the bisector $M_{S23}$ and an adjoining, unillustrated bisector is referred as $V_{S3}$.

It is supposed that each of the control volumes $V_{O3}$, $V_{O2}$, $V_{O1}$, $V_I$, $V_{S1}$, $V_{S2}$, and $V_{S3}$ has a uniform volume concentration $C_{O3}$, $C_{O2}$, $C_{O1}$, $C_I$, $C_{S1}$, $C_{S2}$, or $C_{S3}$ of the dopant or phosphorus. In other words, it is supposed that the whole volume concentrations of the control volumes $V_{O3}$, $V_{O2}$, $V_{O1}$, $V_I$, $V_{S1}$, $V_{S2}$, and $V_{S3}$ are represented by the volume concentrations $C_{O3}$, $C_{O2}$, $C_{O1}$, $C_I$, $C_{S1}$, $C_{S2}$, and $C_{S3}$ at the mesh points O3, O2, O1, I, S1, S2, and S3, respectively.

An arrow $F_{O23}$ denotes a diffusion flux of the dopant or phosphorus from the control volume $V_{O3}$ to the control volume $V_{O2}$. An arrow $F_{O12}$ denotes a diffusion flux of the dopant or phosphorus from the control volume $V_{O2}$ to the control volume $V_{O1}$. An arrow $F_{IO}$ denotes a diffusion flux of the dopant or phosphorus from the control volume $V_{O1}$ to the control volume $V_I$. An arrow $F_{IS}$ denotes a diffusion flux of the dopant or phosphorus from the control volume $V_I$ to the control volume $V_{S1}$. An arrow $F_{S12}$ denotes a diffusion flux of the dopant or phosphorus from the control volume $V_{S1}$ to the control volume $V_{S2}$. An arrow $F_{S23}$ denotes a diffusion flux of the dopant or phosphorus from the control volume $V_{S2}$ to the control volume $V_{S3}$.

Here, the time-differentiation term in the left side of the equation (1) and the divergence operator in the right side of the equation (1) are respectively approximated by the use of a finite time increment $\Delta t_m$ and the inter-point distance $d_{O23}$, $d_{O12}$, $d_{OI}$, $D_{IS}$, $D_{SI2}$, and $d_{S23}$. Then, a set of discreteized diffusion equations are obtained as follows.

$$\frac{C_{O2}^m - C_{O2}^{m-1}}{\Delta t_m} = 2F_{O12} - \frac{F_{O23}}{d_{O23} + d_{O12}} \quad (2a)$$

$$\frac{C_{O1}^m - C_{O1}^{m-1}}{\Delta t_m} = 2F_{IO} - \frac{F_{O12}}{d_{O12} + d_{OI}} \quad (2b)$$

$$\frac{C_I^m - C_I^{m-1}}{\Delta t_m} = 2F_{IS} - \frac{F_{IO}}{d_{OI} + d_{IS}} \quad (2c)$$

$$\frac{C_{S1}^m - C_{S1}^{m-1}}{\Delta t_m} = 2F_{S12} - \frac{F_{IS}}{d_{IS} + d_{S12}} \quad (2d)$$

$$\frac{C_{S2}^m - C_{S2}^{m-1}}{\Delta t_m} = 2F_{S23} - \frac{F_{S12}}{d_{S12} + d_{S23}} \quad (2e)$$

In the equations (2a), (2b), (2c), (2d), and (2e), the phosphorus concentrations $C_{O2}$, $C_{O1}$, $C_I$, $C_{S1}$, and $C_{S2}$ attached with the superscript "m" represents the phosphorus concentrations at a present time $t_m$, and the phosphorus concentrations attached with the superscript "m-1" represents the phosphorus concentrations at a prior time $t_{m-1}$ prior to the time $t_m$ by the time increment $\Delta t_m$.

On the other hand, the diffusion flux $F_{oij}$ in the $SiO_2$ phase 1 and the diffusion flux $F_{Sij}$ in the Si phase 2 are expressed by the following equations (3a) and (3b), respectively, where the suffix i is equal to 1 or 2, and the suffix j is equal to 2 or 3.

$$\left(F_{oij} = -D_O \frac{\partial C_O^m}{\partial x}\right)_{ij} \quad (3a)$$

$$\left(F_{sij} = -D_S \frac{\partial C_S^m}{\partial x}\right)_{ij} \quad (3b)$$

As seen from the equation (3a) and (3b), the diffusion fluxes $F_{oij}$ and $F_{s1j}$ are proportional to the gradients of the local impurity concentrations at the time $t_m$, where $D_O$ and $D_S$ are the diffusion coefficients in the $SiO_2$ and Si phases 1 and 2, respectively.

By approximating the gradients of the local impurity concentrations in the equations (3a) and (3b) by the use of the finite differences of the impurity or phosphorus concentrations at the corresponding mesh points, as shown in the equations (2a), (2b), (2c), (2d), and (2e), the diffusion fluxes $F_{oij}$ and $F_{s1j}$ in the equations (3a) and (3b) are discretized as shown in the following equations (4a) and (4b), respectively.

$$F_{oij} = -D_O C_{Oj}^m - \frac{C_{Oi}^m}{d_{oij}} \quad (4a)$$

$$F_{sij} = -D_S C_{Si}^m - \frac{C_{Si}^m}{d_{Sij}} \quad (4b)$$

Moreover, the diffusion flux $F_{IO}$ from the $SiO_2$ phase 1 to the inter-phase 3 and the diffusion flux $F_{IS}$ from the inter-phase 3 to the Si phase 2 are expressed by the following linear rate equations (5a) and (5b), respectively.

$$F_{IO} = a_{Oi}(C_{I\,max} - C_I^m)C_{O1}^m - e_{iO}C_I^m \quad (5a)$$

$$F_{IS} = a_{Si}(C_{I\,max} - C_I^m)C_{S1}^m - e_{iS}C_I^m \quad (5b)$$

In the rate equations (5a) and (5b), $a_{Oi}$ is an absorption rate or coefficient from the $SiO_2$ phase 1 to the inter-phase 3, $a_{Si}$ is an absorption rate or coefficient from the Si phase 3 to the inter-phase 3, $e_{iO}$ is an emission rate or coefficient from the inter-phase 3 to the $SiO_2$ phase 1, and $e_{iS}$ is an emission rate or coefficient from the inter-phase 3 to the Si phase 3. Also, $C_{Imax}$ is the maximum value of the volume concentration $C_I$ of the control volume $V_I$, which means the maximum phosphorus concentration storable in the inter-phase 3.

The rate equations (5a) and (5b) are used for approximating the pileup phenomenon of phosphorus into the control volume $V_I$, because the pileup phenomenon is not satisfactorily approximated by the use of only the diffusion equation (1).

The volume concentration $C_I^{eq}$ of the phosphorus piled up into the inter-phase 3 (i.e., the control volume $V_I$) in thermal equilibrium is given as the following equation (6) by setting the time-differentiation term for the mesh point I in located the inter-phase 3 to be zero.

$$C_I^{eq} = C_{Imax} \frac{a_{Si}C_{S1} + a_{Oi}C_{O1}}{a_{Si}C_{S1} + a_{Oi}C_{O1} + e_{iS} + e_{iO}} \quad (6)$$

By combining the discretized diffusion equations (2a), (2b), (2c), (2d), and (2e), the discretized diffusion fluxes (4a) and (4b), and the rate equations (5a) and (5b) together, the diffusion equation (1) relating to the doped phosphorus is converted to a set of algebraic equations (not shown here) including the volume concentrations $C_{O3}$, $C_{O2}$, $C_{O1}$, $C_I$, $C_{S1}$, $C_{S2}$, and $C_{S3}$ of the phosphorus as variables.

The set of algebraic equations thus obtained are numerically solved according to a flow chart shown in FIG. 2.

Specifically, first, the time $t_m$ is initialized, i.e., the value of the time $t_m$ is set as zero in the step 51. Also, the other conditions such as the thickness of the $SiO_2$ bulk phase 1, the thickness of the bulk Si phase 2, the diffusion rates $D_O$ and $D_S$, the absorption rates $a_{1O}$ and $a_{1S}$, the emission rates $e_{1O}$ and $e_{iS}$, the time increment $\Delta t_m$, and the diffusion time $t_{dif}$ are determined.

Next, in the step 52, a mesh is defined or configured on the analyzed zone so that at least one of the mesh points (i.e., mesh point I) is located in the inter-phase 3 and the remaining mesh points (i.e., the mesh points O1, O2, O3, and Si, S2, and S3) are located in the $SiO_2$ and Si bulk phases 1 and 2. Initial values of the doped phosphorus concentrations $C_{O3}$, $C_{O2}$, $C_{O1}$, $C_I$, $C_{S1}$, $C_{S2}$, and $C_{S3}$ at the individual mesh points O3, O2, O1, I, S1, S2, and S3 are determined.

In the step 53, the time increment $\Delta t_m$ is added to the present time $t_m$: in other words, the present time $t_m$ is replaced with the prior time $t_{m-1}$ and a next time $(t_{m-1} + \Delta t_m)$ is used as the present time $t_m$.

In the step 54, the set of algebraic equations are solved to thereby generate new values of the doped phosphorus concentrations $C_{O3}$, $C_{O2}$, $C_{O1}$, $C_I$, $C_{S1}$, $C_{S2}$, and $C_{S3}$ at the individual mesh points O3, O2, O1, I, S1, S2, and S3. Then, the initial values of the doped phosphorus concentrations $C_{O3}$, $C_{O2}$, $C_{O1}$, $C_I$, $C_{S1}$, $C_{S2}$, and $C_{S3}$ are rewritten to the new values thus generated.

In the step 55, it is judged whether the present time $t_m$ is equal to the preset last time $t_{end}$ which corresponds to the diffusion time $t_{dif}$ or not. If the answer is "No", the flow is returned to the step 53 and repeats the steps 53 and 54. If the answer is "Yes", the flow or calculation is stopped. In this case, the values of the doped phosphorus concentrations $C_{O3}$, $C_{O2}$, $C_{O1}$, $C_I$, $C_{S1}$, $C_{S2}$, and $C_{S3}$ at the individual mesh points O3, O2, O1, I, S1, S2, and S3 are calculated from $t_m = 0$ to $t_m = t_{end}$.

By plotting the calculated values of the doped phosphorus concentrations $C_{O3}$, $C_{O2}$, $C_{O1}$, $C_I$, $C_{S1}$, $C_{S2}$, and $C_{S3}$ at the individual mesh points O3, O2, O1, I, S1, S2, and S3 on a plane, the concentration curves or graphs are provided on the plane. This means that the diffusion phenomenon of the doped phosphorus is simulated.

With the conventional simulation method as shown in FIGS. 1 and 2, there are the following two problems, which is due to the existence of the inter-phase 3 treated as an independent layer.

A first one of the problems is that the simulation processes such as $SiO_2$ deposition on Si, $SiO_2$ etching on Si, and thermal oxidation of Si equipped with $SiO_2$ is complicated.

Conventional process simulation methods for deposition and etching processes without using any independent intermediate layer like the inter-phase 3 are disclosed in a book entitled "Semiconductor Device Design Simulator" (Supercomputing Technology), written by H. Koike et al., pp. 127–129 and pp. 191–196, published in 1991. A simple simulation method is disclosed on pp. 127–129 and a detailed simulation method is disclosed on pp. 191–196.

If an intermediate layer is provided between $SiO_2$ and Si regions, the intermediate layer needs to be deposited on the Si region prior to deposition of $SiO_2$ in a deposition process of $SiO_2$. Also, in an etching process of $SiO_2$, the intermediate layer needs to be etched from the Si region next to etching of $SiO_2$. Therefore, the simulation process becomes complicated.

A conventional process simulation method for an oxidation process of Si without using any independent intermediate layer like the inter-phase 3 is disclosed in the previously-referred book entitled "Semiconductor Device Design Simulator" (Supercomputing Technology), pp. 29–45.

In the thermal oxidation process of Si, it has been known the interface of the $SiO_2$ and Si is shifted with the growing $SiO_2$. Therefore, both of the interface of the $SiO_2$ region and the intermediate layer and the interface of the Si region and the intermediate layer need to be shifted simultaneously. Thus, in the simulation of this sort where the shape or profile is changed, the intermediate layer makes the simulation complicated.

A second one of the problems is that when the impurity distribution obtained by the result of the process simulation is used for device simulation, the impurity distribution in the intermediate layer needs to be transferred.

Device simulation is a computer simulation to analyze the electric performance or characteristic of a relating semiconductor device based on the impurity distributions and the profiles of the device obtained by the process simulation. A conventional device simulation method is disclosed in the previously-referred book entitled "Process and Device Simulation Techniques", pp. 91–134. Therefore, no explanation about the device simulation is omitted here.

No device simulator uses a concept of the intermediate layer like the inter-phase 3 in FIG. 1. Therefore, the $SiO_2$ and Si regions are treated to be directly contacted with one another in this simulator.

On the other hand, the fact that the doped arsenic atoms are piled up in the $SiO_2$ region in the vicinity of the $SiO_2$/Si interface is reported by Y. Sato et al. in an article, Journal of Electrochemical Society, Vol. 142, No. 2, pp. 655–660, February 1995, entitled "Arsenic Pileup at the $SiO_2$/Si interface".

Therefore, based on the fact reported by Y. Sato et al., the data or information about the distribution of the doped impurity or arsenic in the intermediate layer needs to be transferred or copied to the device simulator as the distribution of the doped impurity or arsenic in a corresponding part of the $SiO_2$ region.

Instead of the above data transfer or copying, the material of the intermediate layer itself may be changed to $SiO_2$. However, this material-changing method causes some thickness increase of the resultant $SiO_2$ region and as a result, the simulation result tends to include some error. Thus, this method is unable to be applied. For example, in the case of a gate oxide of a Metal-Oxide-Semiconductor Field-Effect Transistor (MOSFET), the thickness increase of the $SiO_2$ region serving as the gate oxide will cause some error in the simulation result such as the threshold voltage.

The second problem is due to the assumption that the doped impurity atoms are piled up into the intermediate layer in spite of the fact that the doped impurity atoms are actually piled up into the $SiO_2$ region in the vicinity of the $SiO_2$/Si interface.

SUMMARY OF THE INVENTION

Accordingly, an object of the present invention is to provide a simulation method that makes it possible to simulate diffusion of doped impurity in Si and $SiO_2$ in consideration of the pileup phenomenon of the doped impurity without using any intermediate layer.

Another object of the present invention is to provide a simulation method that makes it possible to simulate thermal oxidation of impurity-doped Si in consideration of the pileup phenomenon of the doped impurity without using any intermediate layer.

Still another object of the present invention is to provide a simulation method that facilitates a process simulation including change of profile or shape of a $SiO_2$ region.

A further object of the present invention is to provide a simulation method that facilitates the data transfer about a process simulation result to a device simulator.

The above objects together with others not specifically mentioned will become clear to those skilled in the art from the following description.

According to a first aspect of the present invention, a simulation method of diffusion of a doped impurity is provided, which is comprised of the following steps (a) to (c).

(a) A mesh having mesh points is configured on a simulated zone including a $SiO_2$ region and a Si region contacted therewith, thereby partitioning the simulated zone into domains.

A first one of the mesh points is located in a $SiO_2$ region. A second one of the mesh points is located in a Si region. A third one of the mesh points is located at an interface of the $SiO_2$ and Si regions.

The third one of the mesh points serves as a double mesh point having first and second impurity concentrations. The first impurity concentration represents a general impurity concentration of a first one of the domains located in the $SiO_2$ region and adjacent to the interface of the $SiO_2$ and Si regions. The second impurity concentration represents a general impurity concentration of a second one of the domains located in the Si region and adjacent to the interface of the $SiO_2$ and Si regions.

(b) Diffusion equations are formed at the respective mesh points in such a way that the doped impurity piles up into the first one of the domains located in the $SiO_2$ region.

(c) The diffusion equations are solved to derive a distribution of the doped impurity in the simulated zone.

With the simulation method according to the first aspect of the present invention, the third one of the mesh points of the mesh, which is configured on the simulated zone, is located at the interface of the $SiO_2$ region and the Si region in the step (a). The third one of the mesh points serves as the double mesh point having the first and second impurity concentrations.

The first impurity concentration of the double mesh point represents the general impurity concentration of the first one of the domains located in the $SiO_2$ region and adjacent to the interface of the $SiO_2$ region and the Si region. The second impurity concentration of the double mesh point represents the general impurity concentration of the second one of the domains located in the Si region and adjacent to the interface of the $SiO_2$ region and the Si region.

In the step (b), the diffusion equations are formed at the respective mesh points in such a way that the doped impurity piles up in the first one of the domains located in the $SiO_2$ region.

Accordingly, the diffusion of the doped impurity in the Si and $SiO_2$ regions is able to be simulated in consideration of the pileup phenomenon of the doped impurity without using any intermediate layer.

Also, since no intermediate layer is necessary for the process simulation, the data transfer about the result of the process simulation to a device simulator is facilitated.

In a preferred embodiment of the method according to the first aspect, the doped impurity is one selected from the group consisting of phosphorus (P), arsenic (As), and antimony (Sb). This is because these three elements may cause the pileup phenomenon.

It is more preferred that phosphorus (P) or arsenic (As) is used as the doped impurity. This is because these two elements are frequently used in the field of semiconductor device fabrication.

In another preferred embodiment of the method according to the first aspect, the first one of the domains located in the $SiO_2$ region is apart from the interface of the $SiO_2$ and Si regions by a distance of 5 Å or less. Since Si has a lattice constant of 5.25 Å, the pileup region typically has a width of 5 Å or greater. Therefore, in this case, a satisfactory space resolution is realized.

According to a second aspect of the present invention, another simulation method of diffusion of a doped impurity is provided, which is comprised of the following steps (a) to (g).

(a) A mesh having mesh points is configured on a simulated zone including a $SiO_2$ region and a Si region contacted therewith, thereby partitioning the simulated zone into domains.

A first one of the mesh points is located in a $SiO_2$ region. A second one of the mesh points is located in a Si region. A third one of the mesh points is located at an initial interface of the $SiO_2$ and Si regions.

The third one of the mesh points serves as a double mesh point having first and second impurity concentrations. The first impurity concentration represents a general impurity concentration of a first one of the domains located in the $SiO_2$ region and adjacent to the initial interface of the $SiO_2$ and Si regions. The second impurity concentration represents a general impurity concentration of a second one of the domains located in the Si region and adjacent to the initial interface of the $SiO_2$ and Si regions.

(b) Concentrations of the domains of the simulated zone are set as pre-oxidation values.

(c) A growth of the $SiO_2$ region in a given oxidizing atmosphere during a specific period is calculated, thereby finding a post-oxidation position of the initial interface of the $SiO_2$ and Si regions and a post-oxidation profile of the $SiO_2$ region.

The initial interface of the $SiO_2$ and Si regions located at the post-oxidation position thus found is defined as a post-oxidation interface of the $SiO_2$ and Si regions.

A part of the Si region sandwiched by the initial interface of the $SiO_2$ and Si regions and the post-oxidation interface thereof is defined as a transition region.

(d) The mesh points and the domains are reconfigured to define a first post-oxidation mesh point located at the post-oxidation interface of the $SiO_2$ and Si regions, a first post-oxidation domain located in the transition region and adjacent to the post-oxidation interface of the $SiO_2$ and Si regions, and a second post-oxidation domain located in the Si region and adjacent to the post-oxidation interface of the $SiO_2$ and Si regions.

The first post-oxidation mesh point serves as a double mesh point having third and fourth impurity concentrations. The third impurity concentration represents a general impurity concentration of the first post-oxidation domain. The fourth impurity concentration represents a general impurity concentration of the second post-oxidation domain.

(e) Diffusion equations are formed at the respective reconfigured mesh points in such a way that the doped impurity piles up from the first one of the domains located in the $SiO_2$ region and adjacent to the initial interface of the $SiO_2$ and Si regions into the first post-oxidation domain located in the transition region and adjacent to the post-oxidation interface of the $SiO_2$ and Si regions.

(f) The diffusion equations are solved to derive a distribution of the doped impurity at the respective reconfigured mesh points in the simulated zone.

(g) The transition region is converted to $SiO_2$ after the step (f).

With the simulation method according to the second aspect of the present invention, in the step (a), the mesh having the mesh points is configured on the simulated zone to thereby partition the simulated zone into domains. The third one of the mesh points is located at the initial interface of the $SiO_2$ and Si regions of the simulated zone. The third one of the mesh points serves as a double mesh point having the first and second impurity concentrations, where the first impurity concentration represents a general impurity concentration of the first one of the domains located in the $SiO_2$ region and adjacent to the initial interface, and the second impurity concentration represents a general impurity concentration of the second one of the domains located in the Si region and adjacent to the initial interface.

Then, the concentrations of the domains of the simulated zone are set as the pre-oxidation values in the step (b).

Next, by calculating the growth of the $SiO_2$ region in the given oxidizing atmosphere during the specific period in the step (c), the post-oxidation interface of the $SiO_2$ and Si regions and the transition region are found.

Subsequently, in the next step (d), the mesh points and the domains are reconfigured to define the first post-oxidation mesh point located at the post-oxidation interface of the $SiO_2$ and Si regions, the first post-oxidation domain located in the transition region and adjacent to the post-oxidation interface of the $SiO_2$ Si regions, and the second post-oxidation domain located in the Si region and adjacent to the post-oxidation interface of the $SiO_2$ Si regions.

The first post-oxidation mesh point serves as a double mesh point having the third and fourth impurity concentrations, where the third impurity concentration represents a general impurity concentration of the first post-oxidation domain and the fourth impurity concentration represents a general impurity concentration of the second post-oxidation domain.

Following this, in the step (e), the diffusion equations are formed at the respective reconfigured mesh points in such a way that the doped impurity piles up from the first one of the domains located in the $SiO_2$ region and adjacent to the initial interface of the $SiO_2$ and Si regions into the first post-oxidation domain located in the transition region and adjacent to the post-oxidation interface of the $SiO_2$ and Si regions.

The diffusion equations are solved in the step (f) to derive the distribution of the doped impurity at the respective reconfigured mesh points in the simulated zone.

Finally, in the step (g), the transition region is converted to $SiO_2$; thus the initial interface of the $SiO_2$ and Si regions is shifted to the post-oxidation interface thereof and the $SiO_2$ region is grown due to oxidation.

Accordingly, thermal oxidation of the impurity-doped Si region is simulated in consideration of the pileup phenomenon of the doped impurity atoms without using any intermediate layer.

Also, since no intermediate layer is necessary for the process simulation, the data transfer about the result of the process simulation to a device simulator is facilitated.

Further, a process simulation including change of profile or shape of the $SiO_2$ region is facilitated.

In the preferred embodiments of the method according to the second aspect, the doped impurity is one selected from the group consisting of phosphorus (P), arsenic (As), and antimony (Sb). This is due to the same reason as shown in the method according to the first aspect.

It is more preferred that phosphorus (P) or arsenic (As) is used as the doped impurity. This is because these two elements are frequently used in the field of semiconductor device fabrication.

In another preferred embodiment of the method according to the second aspect, wherein the reconfigured mesh has a second post-oxidation mesh point having a fifth impurity concentration in the transition region. The second post-oxidation mesh point is apart from the post-oxidation interface of the $SiO_2$ and Si regions by a distance of 5 Å or less. This is due to the same reason as shown in the method according to the first aspect.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
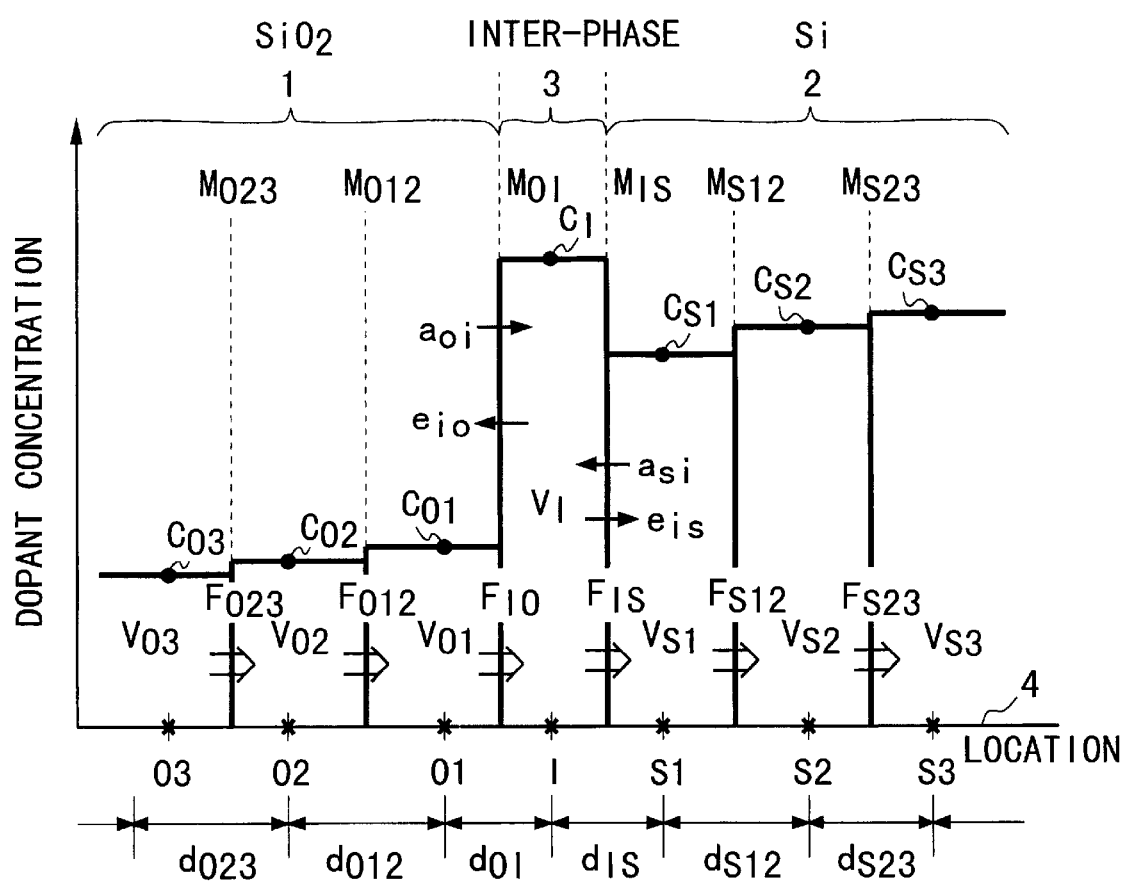
FIG. 1 is a schematic illustration showing the mesh points arranged along the straight line in the simulated zone of the $SiO_2$ and Si bulk phases and the inter-phase in a conventional simulation method of diffusion, in which the dopant concentration at the respective mesh points are illustrated.

Preferred embodiments of the present invention will be described in detail below while referring to the drawings attached.

First Embodiment

Figure 3:
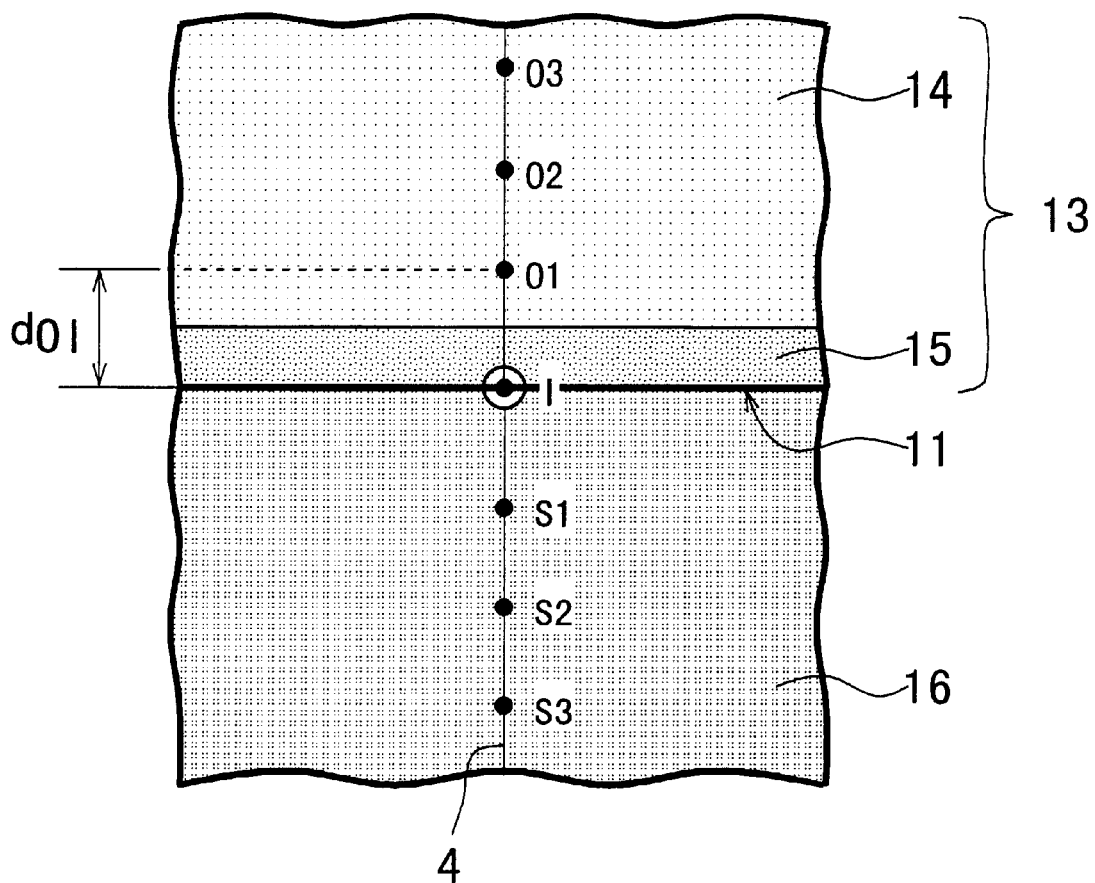
FIG. 3 is a schematic partial plan view of the simulated zone of the $SiO_2$ and Si regions contacted therewith used in a simulation method of diffusion according to a first embodiment of the present invention, in which the mesh points are arranged along a straight line.
Figure 4A:
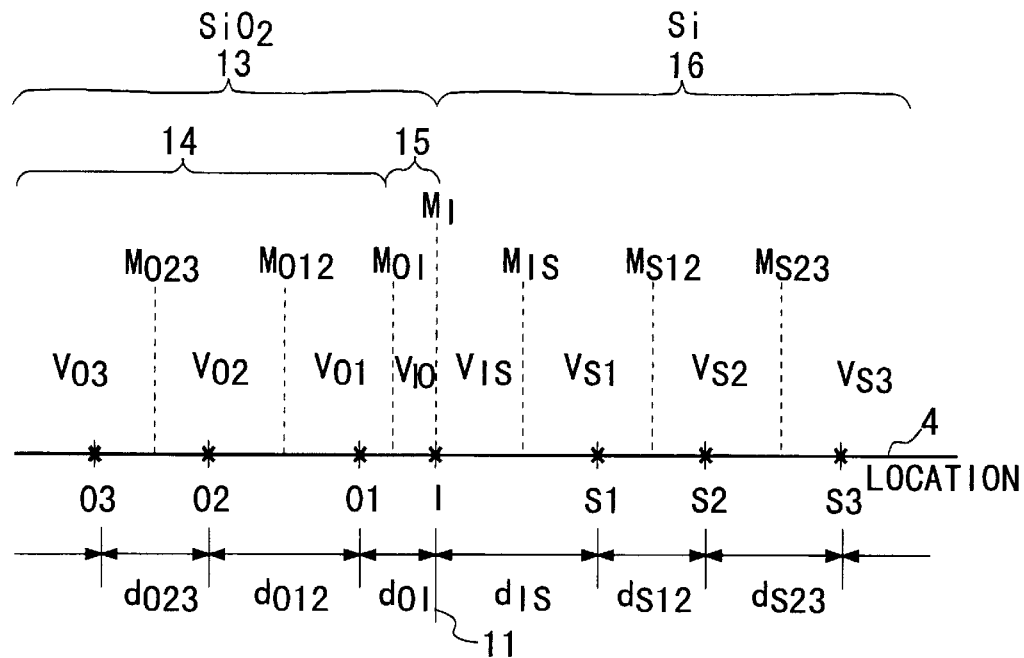
FIGS. 4A and 4B are schematic illustrations showing the mesh points defined in the simulated zone of the $SiO_2$ and Si regions in the simulation method of diffusion according to the first embodiment of FIG. 3, respectively, in which the dopant concentrations at the respective mesh points are illustrated.
Figure 4B:
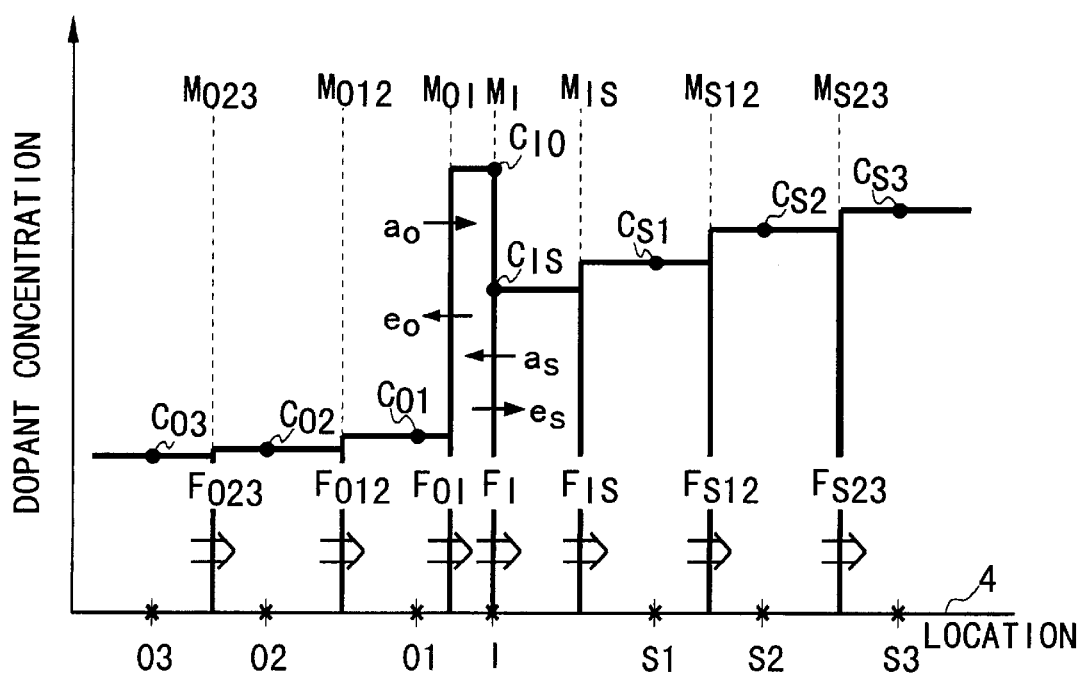
Figure 5:
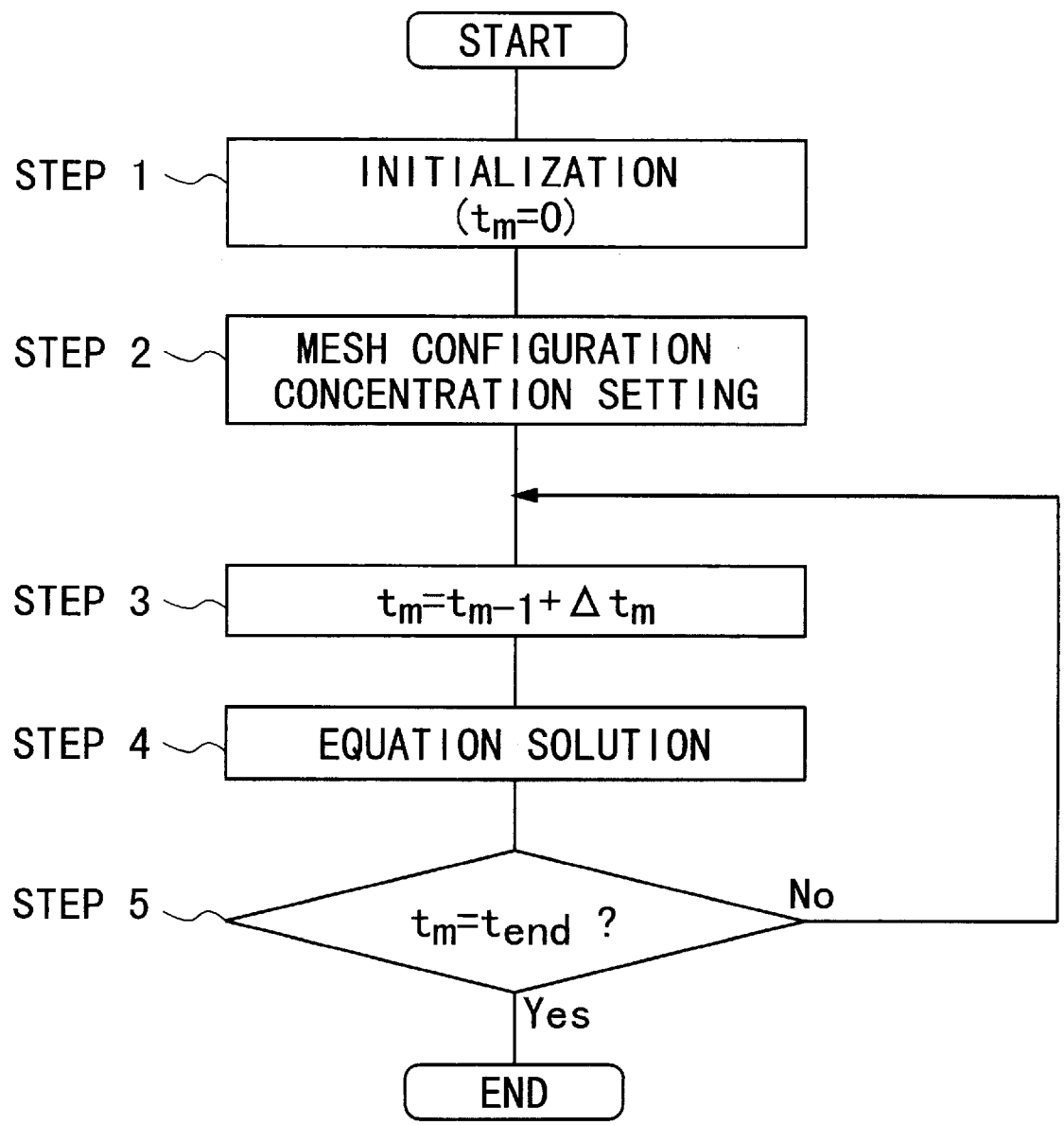
FIG. 5 is a flow chart showing the steps of the simulation method according to the first embodiment.

FIGS. 3 to 5 show a simulation method according to a first embodiment of the present invention, in which a pileup phenomenon of doped phosphorus is simulated.

In FIGS. 3 and 4, a mesh is configured on a simulated zone including a $SiO_2$ region 13 and a Si region 16 contacted therewith, thereby partitioning the simulated zone into domains (i.e., control volumes) $V_{O3}$, $V_{O2}$, $V_{O1}$, $V_{IO}$, $V_{IS}$, $V_{S1}$, $V_{S2}$, and $V_{S3}$ by mesh points O3, O2, O1, I, S1, S2, and S3 of the applied mesh.

The mesh points O1, O2, and O3 are located in the $SiO_2$ region 13. The mesh points S1, S2, and S3 are located in the Si region 16. The mesh point I is located at an interface 11 of the $SiO_2$ and Si regions 13 and 16. These mesh points O1, O2, O3, S1, S2, S3, and I are arranged along a straight reference line 4 perpendicular to the interface 11.

Reference symbols $d_{O23}$, $d_{O12}$, $d_{OI}$, $d_{IS}$, $d_{S12}$, and $d_{S23}$ denote inter-point distances between the adjoining mesh points O3 and O2, O2 and O1, O1 and I, I and S1, S1 and S2, and S2 and S3, respectively.

Figure 2:
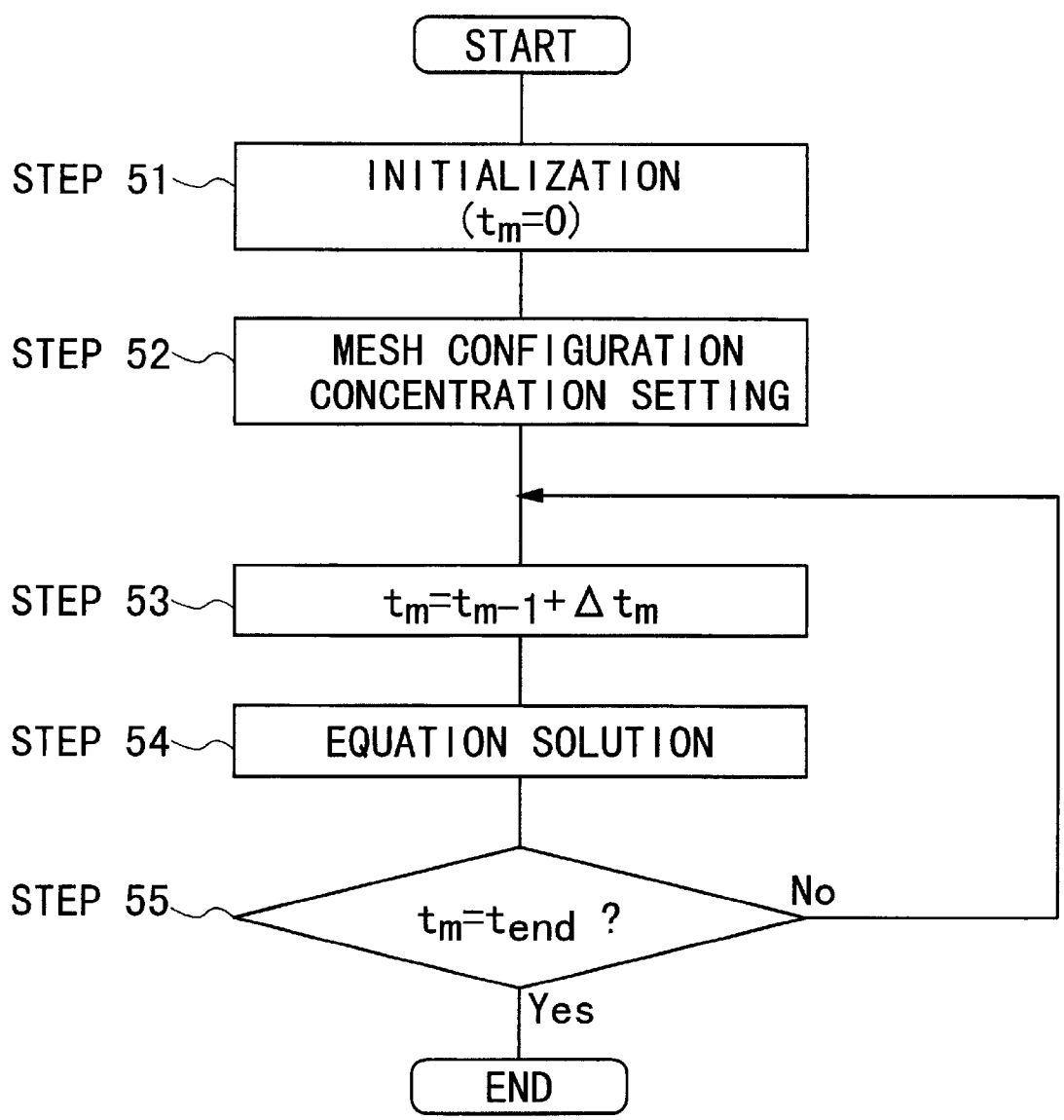
FIG. 2 is a flow chart showing the steps of the conventional simulation method of FIG. 1.

Here, the inter-point distance $d_{OI}$ between the mesh points O1 and I is set as a value of 5 Å or less. In this case, the control volume $V_{IO}$, into which the phosphorus atoms pile up, has a limited width equal to a total thickness of several atomic layers of Si or less. Therefore, like the conventional simulation method using the intermediate layer, as shown in FIGS. 1 and 2, the profile of the piled-up dopant or phosphorus will be able to have a satisfactory space resolution.

The control volume $V_{O3}$ is defined by a bisector $M_{O23}$ between the mesh points O3 and O2 and an adjoining, unillustated bisector between the mesh point O3 and an adjoining, unillustated mesh point. The control volume $V_{O3}$ is located in the $SiO_2$ region 13.

The control volume $V_{O2}$ is defined by the bisector $M_{O23}$ and a bisector $M_{O12}$ between the mesh points O2 and O1. The control volume $V_{O2}$ is located in the $SiO_2$ region 13.

The control volume $V_{O1}$ is defined by the bisector $M_{O12}$ and a bisector $M_{OI}$ between the mesh points O1 and I. The control volume $V_{O1}$ is located in the $SiO_2$ region 13.

The control volume $V_{IO}$ is defined by the bisector $M_{OI}$ and a line $M_I$ located on the mesh point I and at the interface 11. The control volume $V_{IO}$ is located in the $SiO_2$ region 13 and contacted with the interface 11.

The control volume $V_{IS}$ is defined by the line $M_I$ and a bisector $M_{S12}$ between the mesh points I and S1. The control volume $V_{IS}$ is located in the Si region 16 and contacted with the interface 11.

The control volume $V_{S1}$ is defined by the bisector $M_{IS}$ and a bisector $M_{S12}$ between the mesh points S1 and S2. The control volume $V_{S1}$ is located in the Si region 16.

The control volume $V_{S2}$ is defined by the bisector $M_{S12}$ and a bisector $M_{S23}$ between the mesh points S2 and S3. The control volume $V_{S2}$ is located in the Si region 16.

The control volume $v_{S3}$ is defined by the bisector $M_{S23}$ and an adjoining, unillustated bisector between the mesh point S3 and an adjoining, unillustated mesh point. The control volume $V_{S3}$ is located in the Si region 16.

It is supposed that each of the control volumes $V_{O3}$, $V_{O2}$, $V_{O1}$, $V_{IO}$, $V_{IS}$, $V_{S1}$, $V_{S2}$, and $V_{S3}$ has a uniform volume concentration $C_{O3}$, $C_{O2}$, $C_{O1}$, $C_{IO}$, $C_{IS}$, $C_{S1}$, $C_{S2}$, or $C_{S3}$ of the dopant or phosphorus. In other words, it is supposed that the whole volume concentrations of the control volumes $V_{O3}$, $V_{O2}$, $V_{O1}$, $V_{IO}$, $V_{IS}$, $V_{S1}$, $V_{S2}$, and $V_{S3}$ are represented by the volume concentrations $C_{O3}$, $C_{O2}$, $C_{O1}$, $C_{IO}$, $C_{IS}$, $C_{S1}$, $C_{S2}$, and $C_{S3}$, respectively.

Each of the mesh points O3, O2, O1, S1, S2, and S3 is a single mesh point and has the single volume concentration $C_{O3}$, $C_{O2}$, $C_{O1}$, $C_{S1}$, $C_{S2}$, or $C_{S3}$ corresponding to the control volume $V_{O3}$, $V_{O2}$, $V_{O1}$, $V_{S1}$, $V_{S2}$, and $V_{S3}$. On the other hand, the mesh point I located at the interface 11 serves as a double mesh point having the two volume concentrations $C_{IO}$ and $C_{IS}$ corresponding to the control volume $V_{IO}$ and $V_{IS}$, respectively.

An arrow $F_{O23}$ denotes a diffusion flux of the phosphorus from the control volume $V_{O3}$ to the control volume $V_{O2}$. An arrow $F_{O12}$ denotes a diffusion flux of the phosphorus from the control volume $V_{O2}$ to the control volume $V_{O1}$. An arrow $F_{OI}$ denotes a diffusion flux of the phosphorus from the control volume $V_{O1}$ to the control volume $V_{IO}$. An arrow $F_I$ denotes a diffusion flux of the phosphorus from the control volume $V_{IO}$ to the control volume $V_{1S}$, which passes through the interface 11 of the $SiO_2$ and Si regions 13 and 16. An arrow $F_{IS}$ denotes a diffusion flux of the phosphorus from the control volume $V_{IS}$ to the control volume $V_{S1}$. An arrow $F_{S12}$ denotes a diffusion flux of the phosphorus from the control volume $V_{VS1}$ to the control volume $V_{S2}$. An arrow $F_{S23}$ denotes a diffusion flux of the phosphorus from the control volume $V_{S2}$ to the control volume $V_{S3}$.

Here, the time-differentiation term in the left side of the previously-explained equation (1) and the divergence operator in the right side of the same equation (1) are respectively approximated by the use of a finite time increment $\Delta t_m$ and the inter-point distances $d_{O23}$, $d_{O12}$, $d_{OI}$, $d_{IS}$, $d_{S12}$, and $d_{S23}$. Then, a set of discretized diffusion equations are obtained as follows.

$$\frac{C_{O2}^m - C_{O2}^{m-1}}{\Delta t_m} = 2F_{O12} - \frac{F_{O23}}{d_{O23} + d_{O12}} \quad (7a)$$

$$\frac{C_{O1}^m - C_{O1}^{m-1}}{\Delta t_m} = 2F_{OI} - \frac{F_{O12}}{d_{O12} + d_{OI}} \quad (7b)$$

$$\frac{C_{IO}^m - C_{IO}^{m-1}}{\Delta t_m} = 2F_I - \frac{F_{IO}}{d_{OI}} \quad (7c)$$

$$\frac{C_{IS}^m - C_{IS}^{m-1}}{\Delta t_m} = 2F_{IS} - \frac{F_I}{d_{IS}} \quad (7d)$$

$$\frac{C_{S1}^m - C_{S1}^{m-1}}{\Delta t_m} = 2F_{S12} - \frac{F_{IS}}{d_{IS} + d_{S12}} \quad (7e)$$

$$\frac{C_{S2}^m - C_{S2}^{m-1}}{\Delta t_m} = 2F_{S23} - \frac{F_{S12}}{d_{S12} + d_{S23}} \quad (7f)$$

In equations (7a), (7b), (7c), (7d), (7e), and (7f), the phosphorus concentrations $C_{O2}$, $C_{O1}$, $C_{IO}$, $C_{IS}$, $C_{S1}$, $C_{S2}$ attached with the superscript "m" represents the phosphorus concentrations at a present time $t_m$, and the same phosphorus concentrations attached with the superscript "m−1" represents the phosphorus concentrations at a prior time $t_{m-1}$ prior to the time $t_m$ by a specific time increment $\Delta t_m$.

On the other hand, by approximating the gradients of the local impurity concentrations in the previously-explained equations (3a) and (3b) by the use of the finite differences of the impurity or phosphorus concentrations, the diffusion fluxes $F_{Oij}$ in the $SiO_2$ region 13 and the diffusion flux $F_{IS}$ and the diffusion fluxes $F_{Sij}$ in the Si region 16 are discretized in the following equations (8a), (8b) and (8c), respectively, where the suffix i is equal to 1 or 2 and the suffix j is equal to 2 or 3.

$$F_{Oij} = -D_O C_{Oj}^m - \frac{C_{Oi}^m}{d_{Oij}} \quad (8a)$$

$$F_{IS} = -D_S C_{SI}^m - \frac{C_{IS}^m}{d_{IS}} \quad (8b)$$

$$F_{Sij} = -D_S C_{Sj}^m - \frac{C_{Si}^m}{d_{Sij}} \quad (8c)$$

In the equations (8a), (8b) and (8c), $D_O$ and $D_S$ are the diffusion coefficients in the $SiO_2$ and Si regions 13 and 16, respectively.

The fluxes $F_{OI}$ and $F_I$ passing through the control domain $V_{IO}$ (i.e., the pileup region) are given by the following linear rate equations (9a) and (9b), respectively.

$$F_{OI} = a_O(C_{Imax} - C_{IO}^m)C_{OI}^m - e_O C_{IO}^m \quad (9a)$$

$$F_1 = a_S(C_{Imax} - C_{IO}^m)C_{IS}^m - e_S C_{IO}^m \quad (9b)$$

In the rate equations (9a) and (9b), $a_O$ is an absorption rate from the $SiO_2$ region 13 to the Si region 16, $a_S$ is an absorption rate from Si region 16 to the $SiO_2$ region 13, $e_O$ is an emission rate from the Si region 16 to the $SiO_2$ region 13, $e_S$ is an emission rate from the Si region 16 to the $SiO_2$ region 13, and $C_{Imax}$ is the maximum value of the volume concentration $C_I$ of the dopant or phosphorus atoms storable in the control volume $V_{IO}$.

The volume concentration of the phosphorus piled up into the control domain $V_{IO}$ in thermal equilibrium is given as the following equation (10) by setting the time-differentiation term for the volume concentration $C_{IO}$ at the double mesh point I located at the interface 11 to be zero.

$$C_{IO}^{eq} = C_{Imax} \frac{a_S C_{IS} + a_O C_{OI}}{a_S C_{IS} + a_O C_{OI} + e_S + e_O} \quad (10)$$

BY combining the discretized diffusion equations (7a), (7b), (7c), (7d), (7e), and (7f), the discretized diffusion fluxes (8a), (8b), and (8c), and the rate equations (9a) and (9) together, the diffusion equation (1) of the doped phosphorus is converted to a set of algebraic equations (not shown here) including the volume concentrations of the phosphorus as variables.

The set of algebraic equations thus obtained are numerically solved according to a flow chart shown in FIG. 5, which is the same as that shown in FIG. 2

Specifically, first, the time $t_m$ is initialized, i.e., the value of the time $t_m$ is set as zero in the step 1. Also, the other conditions such as the thickness of the $SiO_2$ region 13 the thickness of the Si region 16, the diffusion rates $D_O$ and $D_S$, the absorption rates $a_O$ and $a_S$, the emission rates $e_O$ and $e_S$, the time increment $\Delta t_m$, and the diffusion time $t_{dif}$ are determined.

Next, in the step 2, a mesh is configured on the analyzed or simulated zone so that the mesh points O3, O2, O1, I, S1, S2, and S3 are arranged as shown in FIGS. 3, 4A, and 4B. Initial values of the doped phosphorus concentration at the individual mesh points O3, O2, O1, I, S1, S2, and S3 are determined.

In the step 3, the time increment $\Delta t_m$ is added to the present time $t_m$; in other words, the present time $t_m$ is replaced with the prior time $t_{m-1}$ and a next time $(t_{m-1}+\Delta t_m)$ is used as the present time $t_m$.

In the step 4, the set of algebraic equations are solved to thereby generate new values of the doped phosphorus concentration at the individual mesh points O3, O2, O1, I, S1, S2, and S3 and then, the initial values of the doped phosphorus concentration are rewritten to the new values thus generated.

In the step 5, it is judged whether the present time $t_m$ is equal to the preset last time $t_{end}$ which corresponds to the diffusion time $t_{dif}$ or not. If the answer is "No", the flow is returned to the step 3 and repeats the steps 3 and 4. If the answer is "Yes", the flow or calculation is stopped. In this case, the values of the doped phosphorus concentration at the individual mesh points O3, O2, O1, I, S1, S2, and S3 are calculated from $t_m=0$ to $t_m=t_{end}$.

By plotting the calculated values of the doped phosphorus concentration at the individual mesh points O3, O2, O1, I, S1, S2, and S3 on a plane, the concentration curves or graphs are provided on the plane. This means that the diffusion phenomenon of the doped phosphorus is simulated.

With the simulation method according to the first embodiment shown in FIGS. 3 to 5, the double mesh point I having the two volume concentrations $C_{IO}$ and $C_{IS}$ is located at the interface of the $SiO_2$ and Si regions 13 and 16, where the volume concentrations $C_{IO}$ and $C_{IS}$ represent the whole volume concentrations of the control volumes $V_{IO}$ and $V_{IS}$, respectively. Also, the doped impurity, i.e., phosphorus, is designed to pile up into the control volumes $V_{IO}$.

Therefore, the diffusion of the doped impurity atoms in the Si and $SiO_2$ regions is able to be simulated in consideration of the pileup phenomenon of the doped impurity atoms without using any intermediate layer such as the inter-phase 3 used in the conventional simulation method shown in FIG. 1.

This means that mathematical calculation relating to the intermediate layer becomes unnecessary. As a consequence, the data transfer about the result of the process simulation of the phosphorus pileup to a device simulator is facilitated.

In the above explanation, the mesh points O1, O2, O3, S1, S2, S3, and I are arranged one-dimensionally for the sake of simplification of description. However, it is needless to say that they may be arranged two-, or three-dimensionally.

Figure 6:
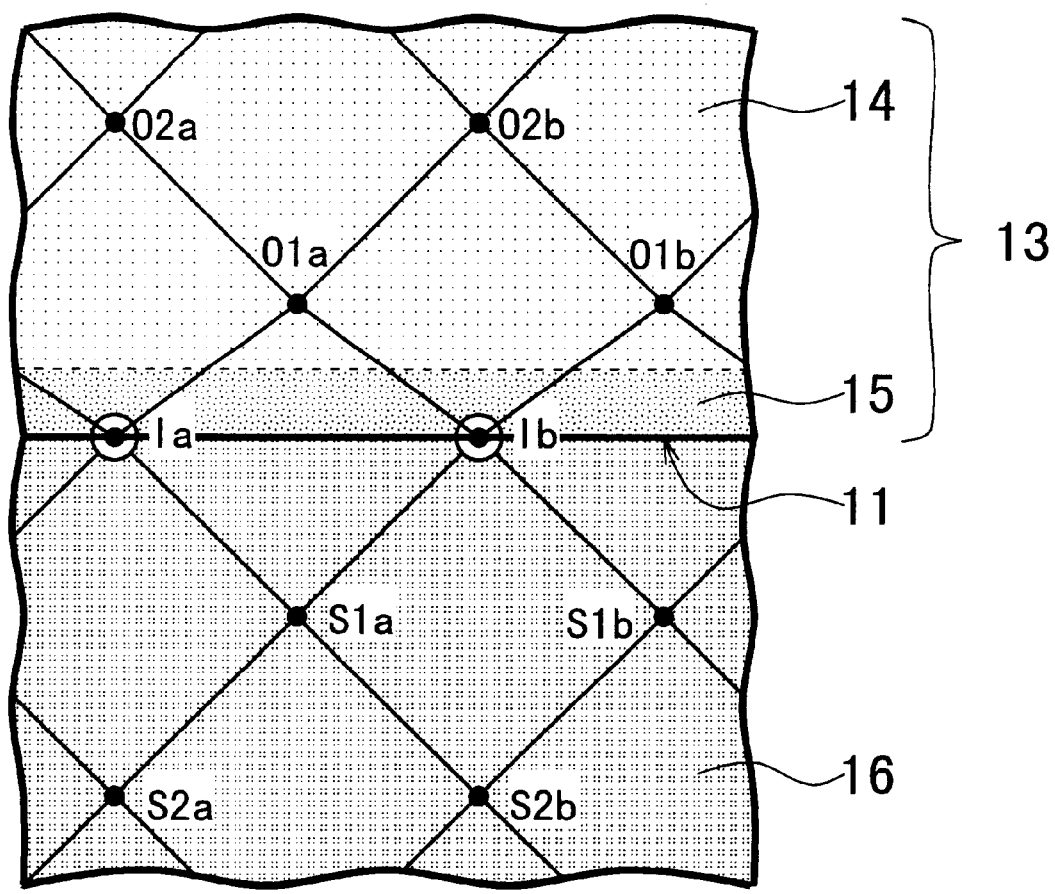
FIG. 6 is a schematic partial plan view of the simulated zone of the $SiO_2$ and Si regions contacted therewith used in the simulation method according to the first embodiment of FIG. 3, in which the mesh points are arranged two-dimensionally.

FIG. 6 show an example of two-dimensional arrangements of the mesh points applicable to the simulation method according to the first embodiment of FIGS. 3, 4A, and 4B.

In FIG. 6, a two-dimensional mesh is configured on the simulated zone, thereby partitioning the zone into quadrangles. Double mesh points $I_a$ and $I_b$ of the mesh are located at the interface 11 of the $SiO_2$ and Si regions 13 and 16. Single mesh points $O_{1a}$, $O_{1b}$, $O_{2a}$, and $O_{2b}$ of the mesh are arranged in the $SiO_2$ region 13. Single mesh points $S_{1a}$, $S_{1b}$, $S_{2a}$, and $S_{2b}$ of the mesh are arranged in the Si region 16. A pileup region 15 is formed in the $SiO_2$ region 13 to extend along the interface 11 and to be contact therewith.

Although not shown here, a threee-dimensional arrangements of the mesh points may be applied to the simulation method according to the first embodiment I in the same way as that of FIG. 6.

Second Embodiment

FIGS. 7A and 7B, FIGS. 8A to 8F, and 9 show a simulation method according to a second embodiment of the present invention.

Figure 7A:
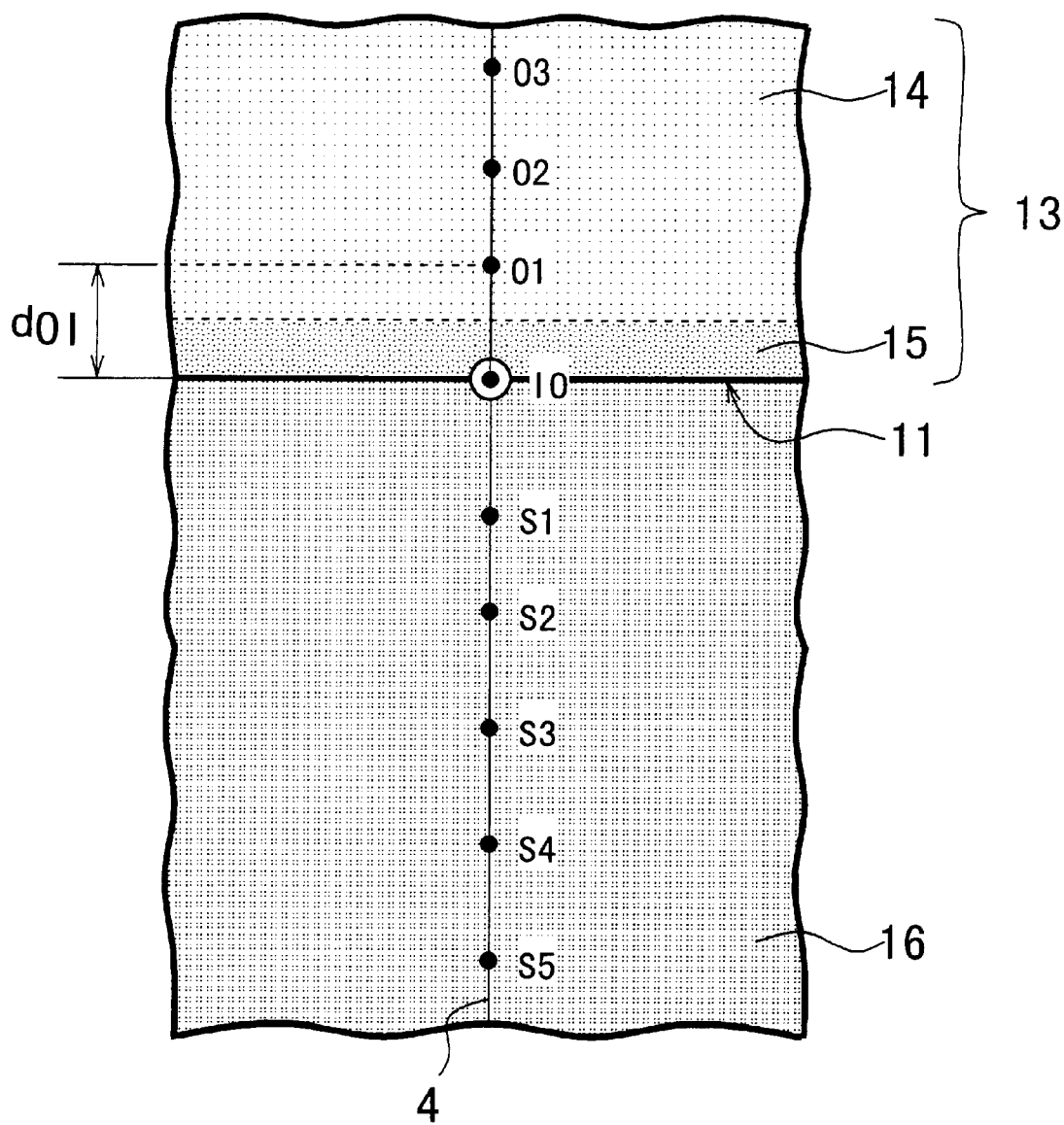
FIG. 7A is a schematic partial plan view of the simulated zone of the $SiO_2$ and Si regions contacted therewith used in a simulation method of diffusion according to a second embodiment, which shows the state prior to oxidation.
Figure 7B:
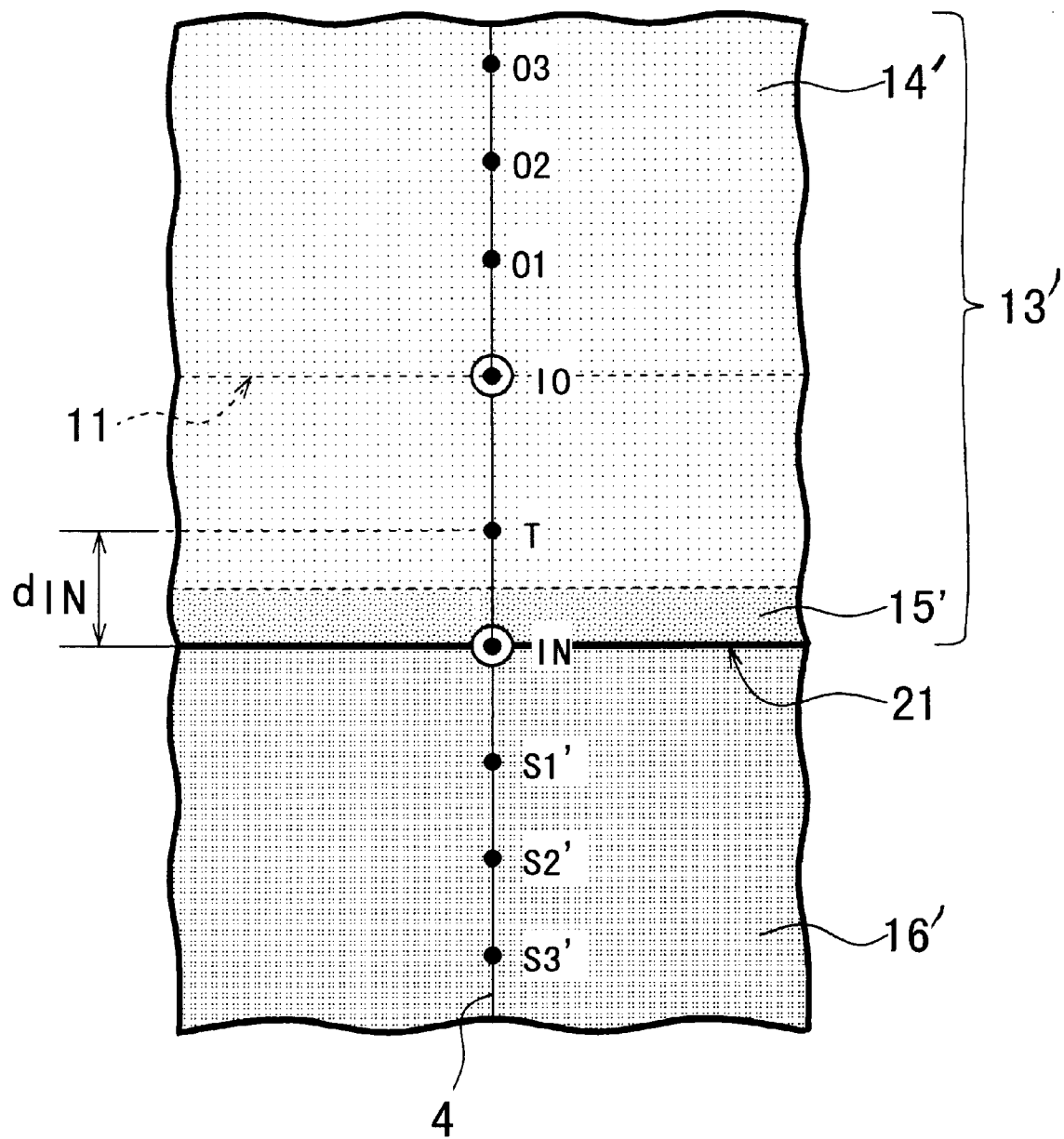
FIG. 7B is a schematic partial plan view of the simulated zone of the $SiO_2$ and Si regions contacted therewith used in the simulation method according to the second embodiment, which shows the state after the oxidation.

When the $SiO_2$ and Si regions 13 and 16 shown in FIG. 3 are heated in an oxidizing atmosphere to thermally oxidize the Si region 16, the interface 11 of the $SiO_2$ and Si regions 13 and 16 shifts toward the Si region 16 along the reference line 4, resulting in a post-oxidation interface 21 apart from the initial or old interface 11, as shown in FIG. 7B.

Together with the shift of the interface 11, the pileup region 15 of doped phosphorus, which is located in the $SiO_2$ region 13 in the vicinity of the interface 11, shifts in the same way as that of the interface 11 due to redistribution of the doped phosphorus during this thermal oxidation process. As a result, a pileup region 15' is formed in the vicinity of the post-oxidation interface 21, as shown in FIG. 7B. Also, the $SiO_2$ region 13 is expanded to the new interface 21, thereby forming a new $SiO_2$ region 13'.

During this oxidation process, the part of the Si region 16 between the interfaces 11 and 21 is converted to $SiO_2$, which is termed here a "transition region 23", as explained later.

Figure 8A:
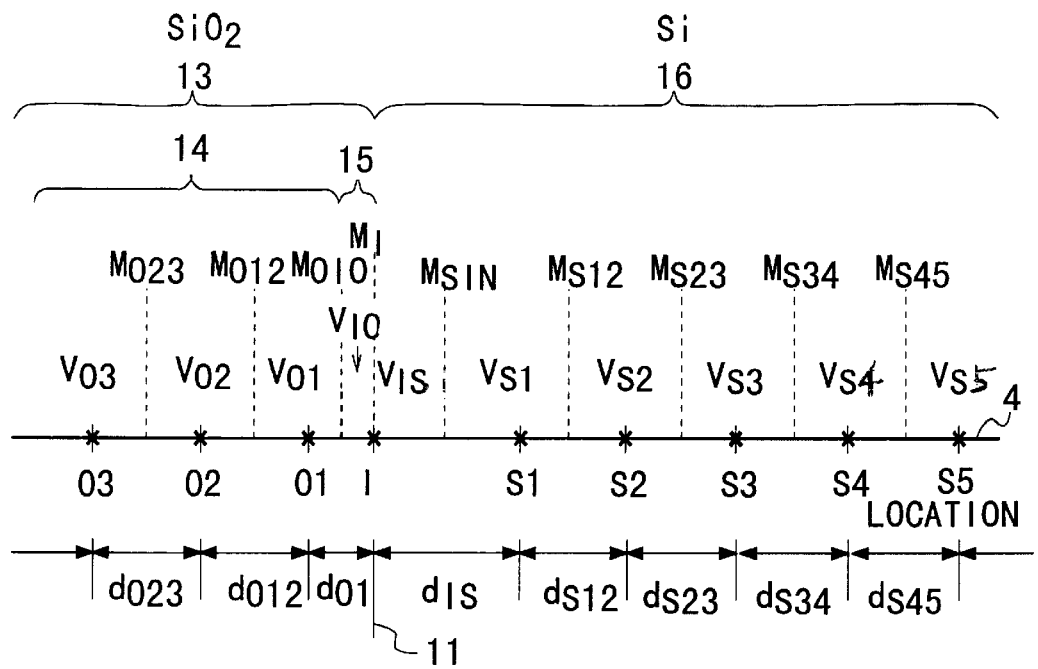
FIGS. 8A and 8B are schematic illustrations showing the mesh points defined in the simulated zone of the $SiO_2$ and Si regions in the simulation method according to the second embodiment, respectively, in which the dopant concentrations at the respective mesh points prior to oxidation are illustrated.
Figure 8B:
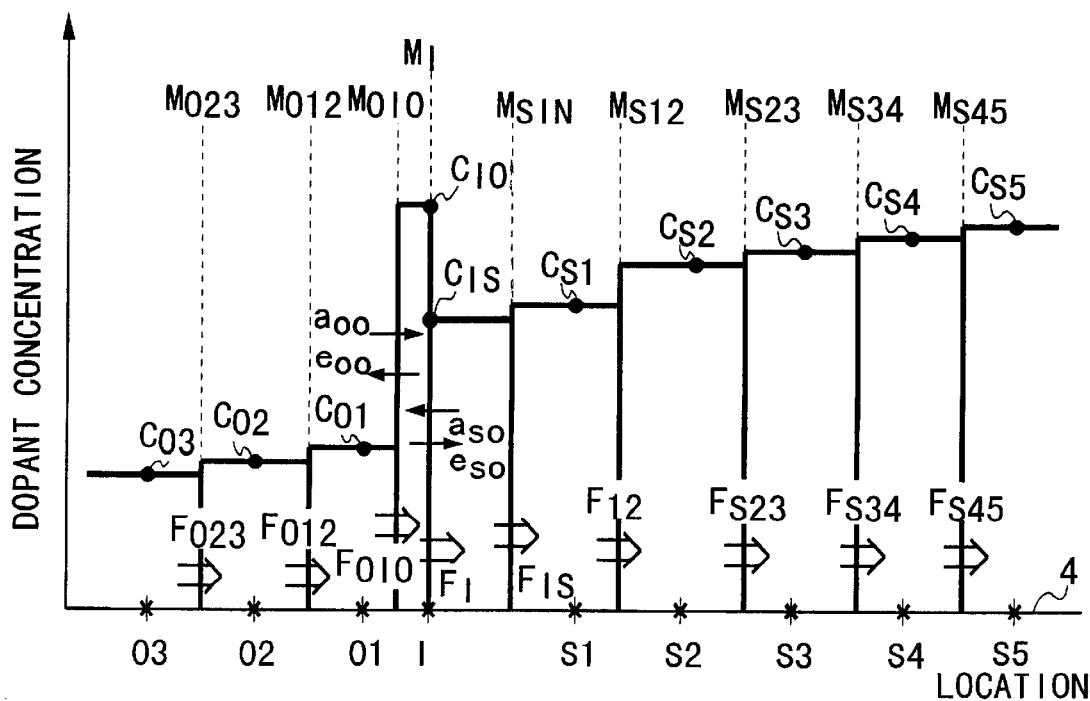
Figure 8C:
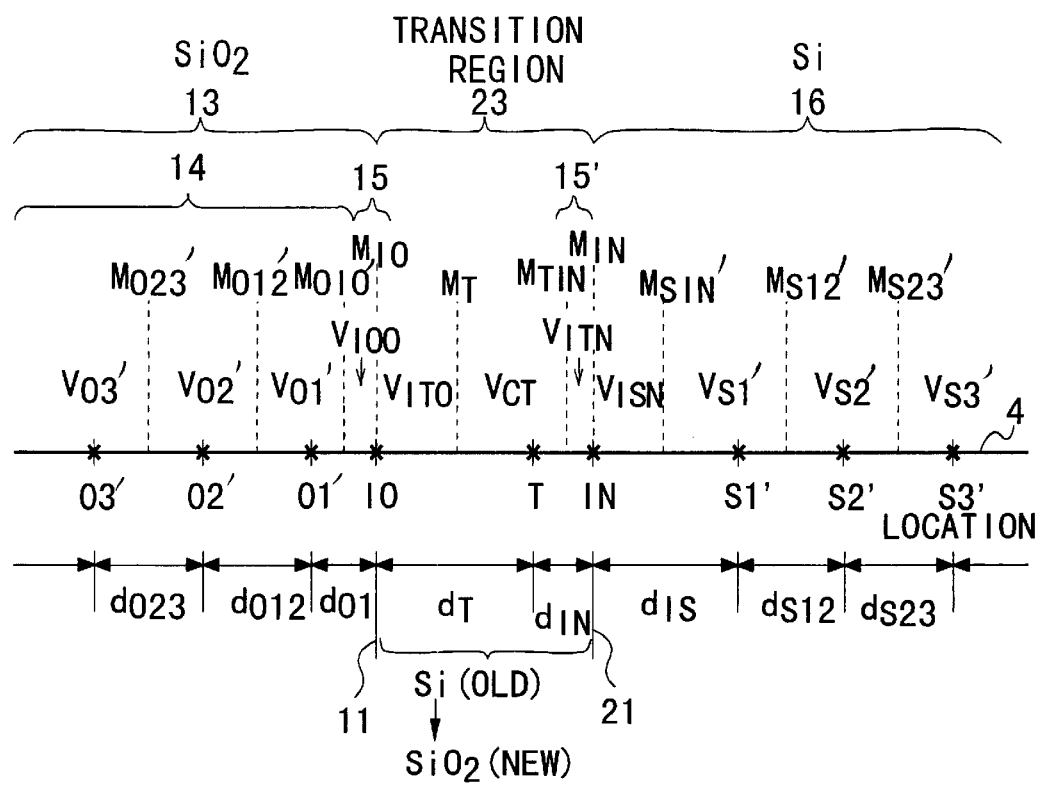
FIGS. 8C and 8D are schematic illustrations showing the mesh points defined in the simulated zone of the $SiO_2$ and Si regions in the simulation method according to the second embodiment, respectively, in which the dopant concentrations at the respective mesh points during oxidation are illustrated.
Figure 8D:
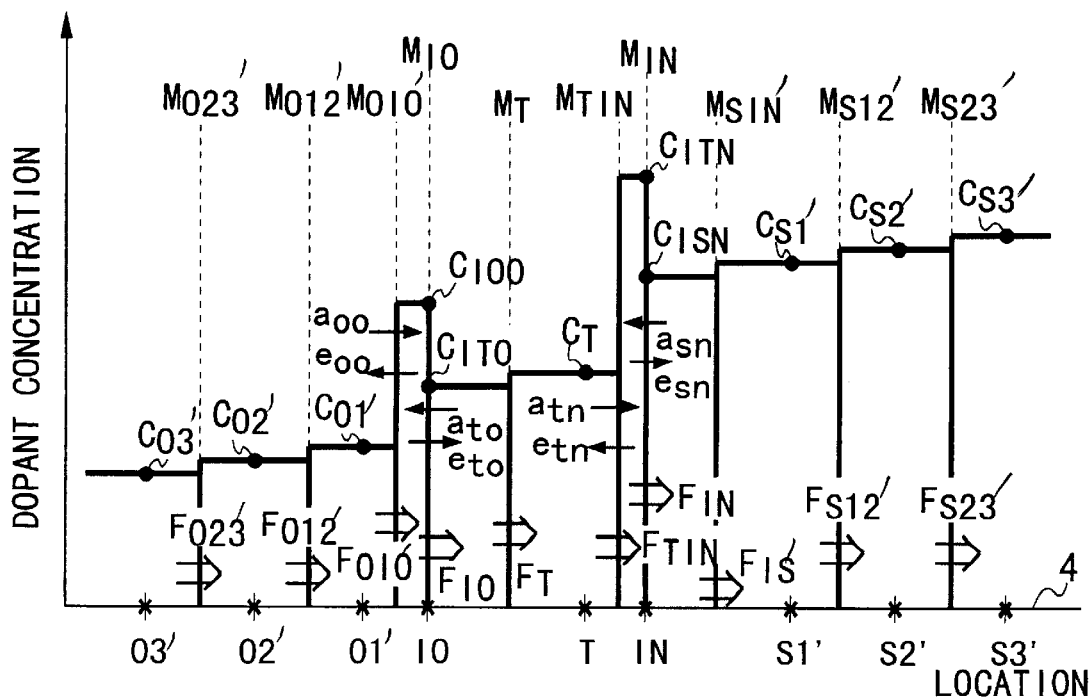
Figure 8E:
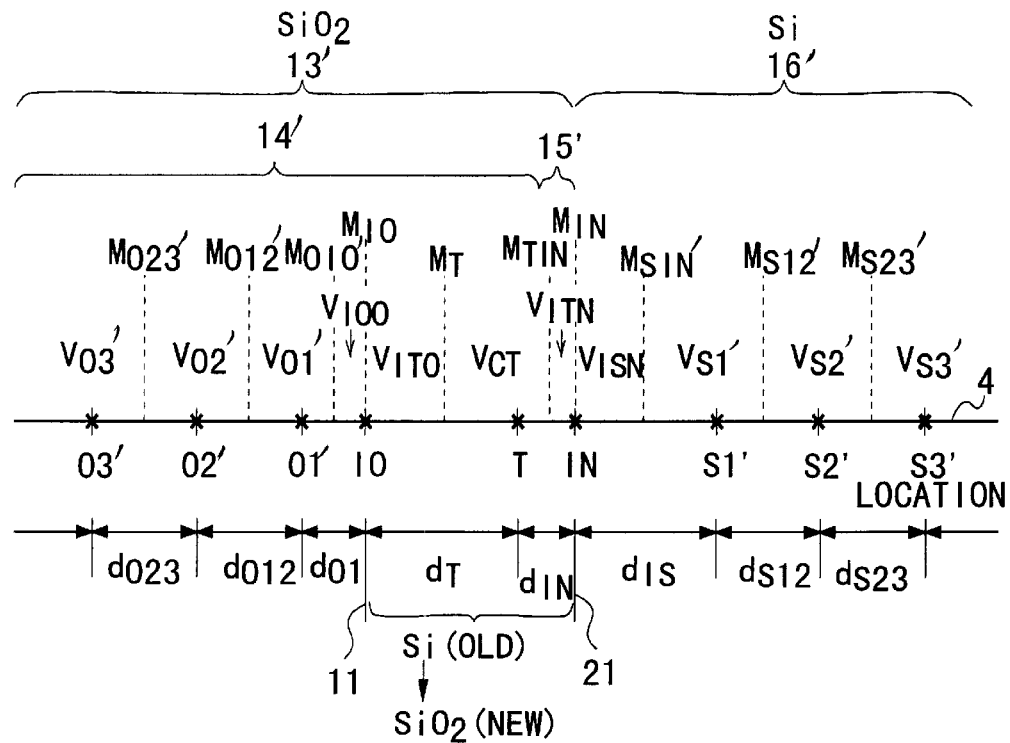
FIGS. 8E and 8F are schematic illustrations showing the mesh points defined in the simulated zone of the $SiO_2$ and Si regions in the simulation method according to the second embodiment, respectively, in which the dopant concentrations at the respective mesh points after oxidation are illustrated.
Figure 8F:
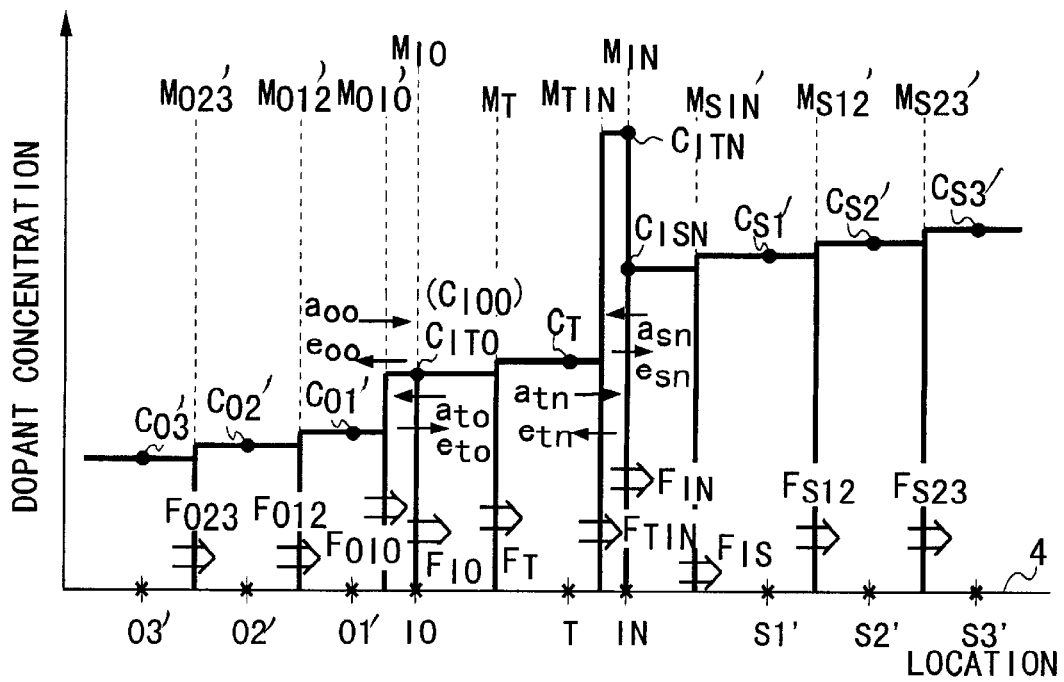

In the simulation method according to the second embodiment, the thermal oxidation process of the doped phosphorus is simulated from the state of FIGS. 7A, 8A, and 8B to the state of FIGS. 7B, 8E, and 8F, through the state of FIGS. 8C and 8D.

At the start of thermal oxidation, as shown in FIGS. 8A and 8B, the mesh is configured on the simulated zone including the $SiO_2$ and Si regions 13 and 16 in the same way as that of the first embodiment.

Specifically, the simulated zone is partitioned into domains or control volumes $V_{O3}$, $V_{O2}$, $V_{O1}$, $V_{IOO}$, $V_{ISN}$, $V_{S1}$, $V_{S2}$, and $V_{S3}$ by mesh points O3, O2, O1, IO, S1, S2, S3, S4, and S5 of the mesh.

The mesh points O1, O2, and O3 are located in the $SiO_2$ region 13. The mesh points S1, S2, S3, S4, and S5 are located in the Si region 16. These mesh points O1, O2, O3 S1, S2, S3, S4, S5, and IO are arranged along a straight reference line 4 perpendicular to the interface 11.

Reference symbols $d_{O23}$, $d_{O12}$, $d_{OI}$, $d_T$, $d_{IN}$, $d_{IS}$, $d_{S12}$, $d_{S23}$, $d_{S34}$, and $d_{S45}$ denote inter-point distances between the adjoining mesh points O3 and O2, O2 and O1, O1 and IO, IO and S1, S1 and S2, and S2 and S3, respectively.

The control volume $V_{O3}$ is defined by a bisector $M_{O23}$ between the mesh points O3 and O2 and an adjoining, unillustated bisector between the mesh point O3 and an adjoining, unillustrated mesh point. The control volume $V_{O3}$ is located in the SiO$_2$ region 13.

The control volume $V_{O2}$ is defined by the bisector $M_{O23}$ and a bisector $M_{O12}$ between the mesh points O2 and O1. The control volume $V_{O2}$ is located in the SiO$_2$ region 13.

The control volume $V_{O1}$ is defined by the bisector $M_{O12}$ and a bisector $M_{OIO}$ between the mesh points O1 and IO. The control volume $V_{O1}$ is located in the SiO$_2$ region 13.

The control volume $V_{IOO}$ is defined by the bisector $M_{OIO}$ and a line $M_{IO}$ located on the mesh point IO and at the old interface 11. The control volume $V_{IOO}$ is located in the SiO$_2$ region 13 and contacted with the old interface 11.

The control volume $V_{ISN}$ is defined by the line $M_{IO}$ and a bisector $M_{SIN}$ between the mesh points IO and S1. The control volume $V_{ISN}$ is located in the Si region 16 and contacted with the new interface 11.

The control volume $V_{S1}$ is defined by the bisector $M_{ISN}$ and a bisector $M_{S12}$ between the mesh points S1 and S2. The control volume $V_{S1}$ is located in the Si region 16.

The control volume $V_{S2}$ is defined by the bisector $M_{S12}$ and a bisector $M_{S23}$ between the mesh points S2 and S3. The contorl volume $V_{S2}$ is located in the Si region 16.

The control volume $V_{S3}$ is defined by the bisector $M_{S23}$ and a bisector $M_{S34}$ between the mesh points S3 and S4. The control volume $V_{S3}$ is located in the Si region 16.

The control volume $V_{S4}$ is defined by the bisector $M_{S34}$ and a bisector $M_{S45}$ between the mesh points S4 and S5. The control volume $V_{S4}$ is located in the Si region 16.

The control volume $V_{S5}$ is defined by the bisector $M_{S45}$ and an adjoining, unillustrated bisector between the mesh point S5 and an adjoining, unillustrated mesh point. The control volume $V_{S5}$ is located in the Si region 16.

It is supposed that each of the control volumes $V_{O3}$, $V_{O2}$, $V_{O1}$, $V_{IOO}$, $V_{ISN}$, $V_{S1}$, $V_{S2}$, $V_{S3}$, $V_{S4}$, and $V_{S5}$ has a uniform volume concentration $C_{O3}$, $C_{O2}$, $C_{O1}$, $C_{IOO}$, $C_{ISO}$, $C_{S1}$, $C_{S2}$, $C_{S3}$, $C_{S4}$, or $C_{S5}$ of the dopant or phosphorus. In other words, it is supposed that the whole volume concentrations of the control volumes $V_{O3}$, $V_{O2}$, $V_{O1}$, $V_{IOO}$, $V_{ISN}$, $V_{S1}$, $V_{S2}$, $V_{S3}$, $V_{S4}$, and $V_{S5}$ are represented by the volume concentrations $C_{O3}$, $C_{O2}$, $C_{O1}$, $C_{IOO}$, $C_{ISO}$, $C_{S1}$, $C_{S2}$, $C_{S3}$, $C_{S4}$, or $C_{S5}$, respectively.

Each of the mesh points O3, O2, O1, S1, S2, S3, S4, S5, and IO is a single mesh point and has the single volume concentration $C_{O3}$, $C_{O2}$, $C_{O1}$, $C_{S1}$, $C_{S2}$, $C_{S3}$, $C_{S4}$, or $C_{S5}$, corresponding to the control volume $V_{O3}$, $V_{O2}$, $V_{O1}$, $V_{S1}$, $V_{S2}$, $V_{S3}$, $V_{S4}$, or $V_{S5}$. On the other hand, the mesh point IO located at the old interface 11 serves as a double mesh point having the two volume concentrations $C_{IOO}$ or $C_{ITO}$ corresponding to the control volumes $V_{IOO}$ and $V_{ISN}$, respectively.

Then, after the start of the thermal oxidation, the initial mesh as defined in FIGS. 8A and 8B is reconfigured on the same simulated zone including the SiO$_2$ and Si regions 13 and 16, as shown in FIGS. 8C and 8D.

Specifically, in FIGS. 8C and 8D, the simulated zone is partitioned into domains or control volumes by new mesh points O3', O2', O1', IO, T, IN, S1', S2', and S3' (S4' and S5' are not shown).

The mesh points O1', O2', and O3' are located in the SiO$_2$ region 13, which are the same as the mesh points O1, O2, and O3, respectively. The mesh points S1', S2', and S3' are located in the Si region 16. The mesh point T is located in the transition region 23. The mesh point IO is located at the old interface 11 of the SiO$_2$ and Si regions 13 and 16, which is the same as the mesh point I. The mesh point IN is located at the new interface 21 of the SiO$_2$ and Si regions 13' and 16'. These mesh points O1', O2', O3', S1', S2', S3', T, IO, and IN are arranged along a straight reference line 4 perpendicular to the interface 11.

Reference symbols $d_{O23}$, $d_{O12}$, $d_{OI}$, $d_T$, $d_{IN}$, $d_{IS}$, $d_{S12}$, and $d_{S23}$ denote inter-point distances between the adjoining mesh points O3' and O2', O2' and O1', O1' and IO, IO and T, T and IN, IN and S1', S1' and S2', and S2' and S3', respectively.

Here, the inter-point distance $d_{IN}$ between the mesh points T and IN is set as a value of 5 Å or less, which is the same as the case of the inter-point distance $d_{OI}$ between the mesh points O1' and IO in the first embodiment. In this case, a control volume $V_{ITN}$, into which the phosphorus atoms newly pile up after redistribution, has a limited width equal to a total thickness of several atomic layers of Si or less. Therefore, like the conventional simulation method using the intermediate layer as shown in FIGS. 1 and 2, the profile of the piled-up dopant or phosphorus will be able to have a satisfactory space resolution.

A control volume $V_{O3}'$ is defined by a bisector $M_{O23}'$ between the mesh points O3' and O2' and an adjoining, unillustated bisector between the mesh point O3' and an adjoining, unillustrated mesh point. The control volume $V_{O3}'$ is located in the SiO$_2$ region 13.

A control volume $V_{O2}'$ is defined by the bisector $M_{O23}'$ and a bisector $M_{O12}'$ between the mesh points O2' and O1'. The control volume $V_{O2}'$ is located in the SiO$_2$ region 13.

A control volume $V_{O1}'$ is defined by the bisector $M_{O12}'$ and a bisector $M_{OIO}$ between the mesh points O1' and IO. The control volume $V_{O1}'$ is located in the SiO$_2$ region 13.

A control volume $V_{IOO}$ is defined by the bisector $M_{OIO}$ and a line $M_{IO}$ located on the mesh point IO and at the old interface 11. The control volume $V_{IOO}$ is located in the SiO$_2$ region 13 and contacted with the old interface 11.

A control volume $V_{ITO}$ is defined by the line $M_{IO}$ and a bisector $M_T$ between the mesh point IO and T. The control volume $V_{ITO}$ is located in the transition region 23 and contacted with the old interface 11.

A control volume $V_{CT}$ is defined by the bisector $M_T$ and a bisector $M_{TIN}$ between the mesh point T and IN. The control volume $V_{CT}$ is located in the transition region 23.

A control volume $V_{ITN}$ is defined by the bisector $M_{TIN}$ and a line $M_{IN}$ between the mesh point T and IN. The control volume $V_{ITN}$ is located in the transition region 23 and contacted with the new interface 21.

A control volume $V_{ISN}$ is defined by the line $M_{IN}$ and a bisector $M_{SIN}$ between the mesh points IN and S1. The control volume $V_{ISN}$ is located in the Si region 16 and contacted with the new interface 21.

A control volume $V_{S1}'$ is defined by the bisector $M_{ISN}$ and a bisector $M_{S12}'$ between the mesh points S1' and S2'. The control volume $V_{S1}'$ is located in the Si region 16.

The control volume $V_{S2}'$ is defined by the bisector $M_{S12}'$ and a bisector $M_{S23}'$ between the mesh oints S2' and S3'. The control volume $V_{S2}'$ is located in the Si region 16.

The control volume $V_{S3}'$ is defined by the bisector $M_{S23}'$ and an adjoining, unillustated bisector between the mesh point S3' and an adjoining, unillustated mesh point. The control volume $V_{S3}'$ is located in the Si region 16.

It is supposed that each of the control volumes $V_{O3}'$, $V_{O2}'$, $V_{O1}'$, $V_{IOO}$, $V_{ITO}$, $V_{CT}$, $V_{ITN}$, $V_{ISN}$, $V_{S1}'$, $V_{S2}'$, and $V_{S3}'$ has a uniform volume concentration $C_{O3}'$, $C_{O2}'$, $C_{O1}'$, $C_{IOO}$, $C_{ITO}$, $C_T$, $C_{ITN}$, $C_{ISN}$, $C_{S1}'$, $C_{S2}'$, or $C_{S3}'$ of the dopant or phosphorus. In other words, it is supposed that the whole volume concentrations of the control volumes $V_{O3}'$, $V_{O2}'$, $V_{O1}'$, $V_{IOO}$, $V_{ITO}$, $V_{CT}$, $C_{ITN}$, $V_{ISN}$, $V_{S1}'$, $V_{S2}'$, and $V_{S3}'$ are represented by the volume concentrations $C_{O3}'$, $C_{O2}'$, $C_{O1}'$, $C_{IOO}$, $C_{ITO}$, $C_T$, $C_{ITN}$, $C_{ISN}$, $C_{S1}'$, $C_{S2}'$, or $C_{S3}'$, respectively.

Each of the mesh points O3', O2', O1', S1', S2', S3', and T is a single mesh point and has the single volume concentration $C_{O3}'$, $C_{O2}'$, $C_{O1}'$, $C_{S1}'$, $C_{S2}'$, $C_{S3}'$, or $C_T$ corresponding to the control volume $V_{O3}'$, $V_{O2}'$, $V_{O1}'$, $V_{S1}'$, $V_{S2}'$, $V_{S3}'$, or $V_{CT}$. On the other hand, the mesh point IO located at the old interface 11 serves as a double mesh point having the two volume concentrations $C_{IOO}$ or $C_{ITO}$ corresponding to the control volumes $V_{IOO}$ and $V_{ITO}$, respectively. The mesh point IN located at the new interface 21 serves as a double mesh point having the two volume concentrations $C_{ITN}$ and $C_{ISN}$ corresponding to the control volumes $V_{IT}$ and $V_{ISN}$, respectively.

Due to the shift of the initial interface 11 and the redistribution of the doped phosphorus, the volume concentration $C_{IOO}$ of the control volume $V_{IOO}$ lowers to approach the volume concentration $C_{O1}'$ of the adjoining control volume $V_{O1}'$. Simultaneously, the volume concentration $C_{ITN}$ of the control volume $V_{ITN}$ rises to a value apart from the volume concentration $C_{ISN}$ of the adjoining control volume $V_{ISN}$, as shown in FIGS. 8E and 8F.

Further, the doped phosphorus is distributed more readily in Si than in $SiO_2$ due to the segregation phenomenon except for the pileup region 15. Therefore, the volume concentrations $C_{ITO}$ and $C_T$ of the control volumes $V_{ITO}$ and $V_{CT}$ decrease with the progressing change of the transition region 23 from Si to $SiO_2$. Because of this decrease of the volume concentrations $C_{ITO}$ and $C_T$, the volume concentration $C_{ITN}$ of the control volume $V_{ITN}$ is raised. According to the circumstances, the volume concentrations $C_{ISN}$ and $C_{S1}$ of the control volumes $V_{ISN}$ and $V_{S1}$ may be raised.

In FIGS. 8C and 8D, an arrow $F_{O23}'$ denotes a diffusion flux of the phosphorus from the control volume $V_{O3}'$ to the control volume $V_{O2}'$. An arrow $F_{O12}'$ denotes a diffusion flux of the phosphorus from the control volume $V_{O2}'$ to the control volume $V_{O1}'$. An arrow $F_{OIO}'$ denotes a diffusion flux of the phosphorus from the control volume $V_{O1}'$ to the control volume $V_{ITO}$. An arrow $F_{IO}$ denotes a diffusion flux of the phosphorus from the control volume $V_{IOO}$ to the control volume $V_{ITO}$, which passes through the old interface 11 of the $SiO_2$ and Si regions 13 and 16. An arrow $F_T$ denotes a diffusion flux of the phosphorus from the control volume $V_{ITO}$ to the control volume $V_{CT}$. An arrow $F_{TIN}$ denotes a diffusion flux of the phosphorus from the control volume $V_{CT}$ to the control volume $V_{TIN}$. An arrow $F_{IN}$ denotes a diffusion flux of the phosphorus from the control volume $V_{ITN}$ to the control volume $V_{ISN}$, which passes through the new interface 21 of the $SiO_2$ and Si regions 13 and 16. An arrow $F_{IS}'$ denotes a diffusion flux of the phosphorus from the control volume $V_{ISN}$ to the control volume $V_{S1}'$. An arrow $F_{S12}'$ denotes a diffusion flux of the phosphorus from the control volume $V_{S1}'$ to the control volume $V_{S2}'$. An arrow $F_{S23}'$ denotes a diffusion flux of the phosphorus from the control volume $V_{S2}'$ to the control volume $V_{S3}'$.

In the simulation method according to the second embodiment, to simulate the redistribution process of the doped phosphorus during the thermal oxidation, it is supposed that the phosphorus stored in the initial pileup region 15 and the excessive phosphorus existing in the transition region 23 diffuse toward the Si region 16.

The diffusion flux $F_{OIO}'$ of the phosphorus from the control volume $V_{O1}'$ to the control volume $V_{IOO}$ and the diffusion flux $F_{IO}$ of the phosphorus from the control volume $V_{IOO}$ to the control volume $V_{ITO}$ at the time $t_m$ are give by the following linear rate equations (11a) and (11b), respectively.

$$F_{OIO} = a_{OO}(C_{Imax} - C_{IOO}{}^m)C_{O1}{}^m - e_{OO}C_{IOO}{}^m \qquad (11a)$$

$$F_{IO} = a_{IO}(C_{Imax} - C_{IOO}{}^m)C_{ITO}{}^m - e_{IO}C_{IOO}{}^m \qquad (11b)$$

In the equations (11a) and (11b), $a_{OO}$ is an absorption rate of the control volume $V_{IOO}$ from the control volume $V_{O1}'$ in the $SiO_2$ region 13 and $a_{IO}$ is an absorption rate of the control volume $V_{IOO}$ from the control volume $V_{ITO}$ in the transition region 23. Also, $e_{OO}$ is an emission rate of the control volume $V_{IOO}$ to the control volume $V_{O1}'$ in the $SiO_2$ region 13 and $e_{IO}$ is an emission rate of the control volume $V_{IOO}$ to the control volume $V_{ITO}$ in the transition region 23. $C_{Imax}$ is the maximum volume concentration value of the phosphorus atoms storable in the control volume $V_{IOO}$.

To equalize approximately or approach the volume concentration $C_{IOO}$ of the control volume $V_{IOO}$, which is one of the two concentrations of the double mesh point IO, to the volume concentration $C_{O1}'$ of the adjoining control volume $V_{O1}'$, the values of $a_{OO}$, $a_{IO}$, $e_{OO}$, $e_{IO}$, and $C_{Imax}$ are set to satisfy the following relationship as $$e_{OO} = e_{IO} = a_{OO} \cdot C_{Imax} = a_{IO} \cdot C_{Imax}$$

Moreover, the values of $a_{OO}$, $a_{IO}$, $e_{OO}$, $e_{IO}$, and $C_{Imax}$ are set so that the diffusion fluxes $F_{IO}$ and $F_{OIO}$ relating to the control volume $V_{IOO}$ have values large enough for pulling out the piled-up phosphorous atoms existing in the volume $V_{IOO}$.

The diffusion flux $F_T$ in the transition region 23 is expressed by the following equation (12), which has a typical form of a popular diffusion flux.

$$F_T = -D_T \frac{C_T^m - C_{ITO}^m}{d_T} \qquad (12)$$

In the equation (12), $D_T$ is the diffusion coefficient of phosphorus existing in the transition region 23. The value of $D_T$ is set so that the diffusion fluxes $F_{IO}$ and $F_{OIO}$ relating to the control volume $V_{IOO}$ have a value large enough for transporting the piled-up phosphorus atoms existing in the volume $V_{IOO}$ during the period between the times $t_{m-1}$ to $t_m$.

In the method according to the second embodiment, only one mesh point T is provided in the transition region 23. However, it is needless to say that two or more mesh points may be provided in the transition region 23. In this case, the diffusion flux is provided for each of the mesh points. No mesh point may be provided in the region 23.

The diffusion fluxes $F_{TIN}$ and $F_{IN}$ in the transition region 23 relating to the control volume $V_{ITN}$ are expressed by the following equations (13a) and (13b), respectively.

$$F_{TIN} = a_{in}(C_{Imax} - C_{ITN}{}^m)C_T{}^m - e_{in}C_{ITN}{}^m \qquad (13a)$$

$$F_{IN} = a_{sn}(C_{Imax} - C_{ITN}{}^m)C_{ISN}{}^m - e_{sn}C_{ITN}{}^m \qquad (13b)$$

In the equations (13a) and (13b), $a_{tn}$ is an absorption rate of the control volume $V_{ITN}$ from the control volume $V_{CT}$ in the transition region 23 and $a_{sn}$ is an absorption rate of the control volume $V_{ITN}$ from the control volume $V_{ISN}$ in the Si region 16. Also, $e_{tn}$ is an emission rate of the control volume $V_{ITN}$ to the control volume $V_{CT}$ in the transition region 23 and $e_{sn}$ is an emission rate of the control volume $V_{ITN}$ to the control volume $V_{ISN}$ in the Si region 16. $C_{Imax}$ is the maximum volume concentration value of the phosphorus atoms stored in the control volume $V_{ITN}$.

Since the volume concentration $C_{ITN}$ of the volume $V_{ITN}$ denotes the piled-up phosphorus, the transition region 23 can be treated as a $SiO_2$ region. Therefore, the absorption and emission rates used in the method according to the first embodiment may be used for the second embodiment with no change.

In the same way as that of the first embodiment, approximately the time-differentiation term in the left side of the previously-explained equation (1) and the divergence operator in the right side of the same equation (1) by the use of a finite time increment $\Delta t_m$ and the inter-point distances $d_{O23}$, $d_{O12}$, $d_{OI}$, $d_{IS}$, $d_{S12}$, and $d_{S23}$, a set of discretized diffusion equations are obtained as follows.

$$\frac{C^m_{IOO} - C^{m-1}_{IOO}}{\Delta t_m} = 2F_{IO} - \frac{F_{OIO}}{d_{OI}} \quad (14a)$$

$$\frac{C^m_{ITO} - C^{m-1}_{ITO}}{\Delta t_m} = 2F_T - \frac{F_{IO}}{d_T} \quad (14b)$$

$$\frac{C^m_T - C^{m-1}_T}{\Delta t_m} = 2F_{TIN} - \frac{F_T}{d_T + d_{IN}} \quad (14c)$$

$$\frac{C^m_{ITN} - C^{m-1}_{ITN}}{\Delta t_m} = 2F_{IN} - \frac{F_{TIN}}{d_{IN}} \quad (14d)$$

By substituting the above-described diffusion fluxes $F_{OIO}$, $F_{IO}$, $F_T$, $F_{TIN}$, and $F_{IN}$ expressed by the equations (11a), (11b), (12), (13a), and (13b) into the equations (14a) to (14d), the diffusion equation (1) of the doped phosphorus is converted to a set of algebraic equations (not shown here) including the volume concentrations of the phosphorus as variables.

Figure 9:
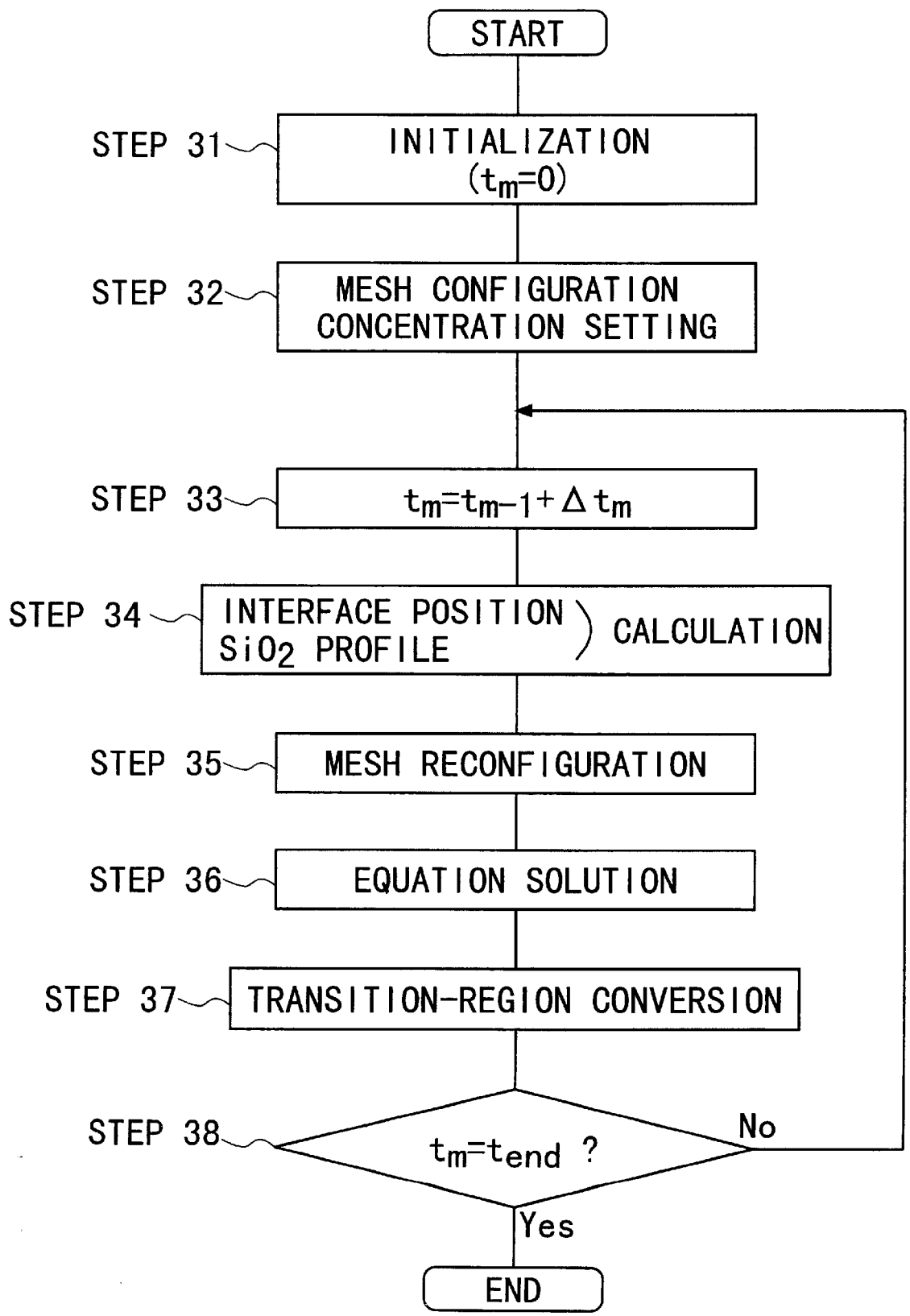
FIG. 9 is a flow chart showing the steps of the simulation method according to the second embodiment.

The set of algebraic equations thus obtained are numerically solved according to a flow chart shown in FIG. 9.

Specifically, first, the time $t_m$ is initialized, i.e., the value of the time $t_m$ is set as zero in the step 31. Also, the other conditions such as the thickness of the $SiO_2$ region 13 the thickness of the Si region 16, the diffusion rates $D_O$ and $D_S$, the absorption rates $a_O$ and $a_S$, the emission rates $e_O$ and $e_S$, the time increment $\Delta t_m$, and the diffusion time $t_{dif}$ are determined.

Next, in the step 32, a mesh is configured on the analyzed or simulated zone so that the mesh points O3, O2, O1, I, S1, S2, S3, S4, and S5 are arranged as shown in FIGS. 8A and 8B. Initial values of the doped phosphorus concentration at the individual mesh points O3, O2, O1, I, S1, S2, S3, S4, and S5 are determined.

In the step 33, the time increment $\Delta t_m$ is added to the present time $t_m$; in other words, the present time $t_m$ is replaced with the prior time $t_{m-1}$ and a next time ($t_{m-1}+\Delta t_m$) is used as the present time $t_m$.

The above steps 31 to 33 are the same as the steps 1 to 3 in the first embodiment, respectively.

Subsequently, in the step 34, a growth of the $SiO_2$ region 13 in a given oxidizing atmosphere during the specific period is calculated, thereby finding a new or post-oxidation position of the interface 11 of the $SiO_2$ and Si regions 13 and 16 and a post-oxidation profile of the $SiO_2$ region 13. The interface 11 located at the post-oxidation position thus found is defined as the new or post-oxidation interface 21 of the $SiO_2$ and Si regions 13 and 16. Thus, the part of the Si region 13 to be converted to $SiO_2$ due to oxidation during the specific period (i.e., the part between the old and new interfaces 11 and 21) is defined as the transition region 23.

In detail, a diffusion equation for the oxidizing agent is provided in the $SiO_2$ region 13 and the equation thus provided is solved, thereby calculating the moving or shifting distance of the old interface 11. On the other hand, the volume expansion occurring in conversion of the Si region 16 to $SiO_2$ is calculated in consideration of a stress. Thus, the post-oxidation profile of the $SiO_2$ region 13, the position of the new or post-oxidation interface 22, and the profile of the transition region 23 are found.

Due to the volume expansion of the Si region 16, the volume concentrations $C_{ITO}$ and $C_T$ are decreased.

In the step 35, the mesh is reconfigured with respect to the new interface 21, thereby defining the mesh points T, IO, and IN and the corresponding control volumes $V_{CT}$, $V_{ITO}$, and $V_{ITN}$ in the transition region 23. At the same time, the control volumes $V_{IO}$ and $V_{IS}$ are redefined as the control volumes $V_{IOO}$ and $V_{ISN}$, respectively. Further, the control volumes $V_{O3}'$, $V_{O2}'$, $V_{O1}'$, $V_{S1}'$, $V_{S2}'$, and $V_{S3}$ are redefined, as shown in FIGS. 8C and 8D.

It is needless to say that the mesh point IO, which is located at the old interface 11, is a double mesh point having the volume concentrations $C_{IOO}$ and $C_{ITO}$. The mesh point IN, which is located at the new interface 21, is a double mesh point having the volume concentrations $C_{ISN}$ and $C_{ITN}$. The mesh point T, which is located in the transition region 23, is a single mesh point having the volume concentration $C_T$.

$D_T$ is an inter-point distance between the mesh points IO and T, and $d_{IN}$ is an inter-point distance between the mesh points IN and T. The inter-point distance $d_{IN}$ is set as a value of 5 Å or less because of the same reason as that of the inter-point distance $d_{OI}$ between the mesh points O1 and I in FIG. 4.

The distribution of the doped phosphorus obtained by the old mesh as shown in FIGS. 8A and 8B is transferred to the new or reconfigured mesh as shown in FIGS. 8C and 8D after an interpolation process. Then, it is used as the initial distribution for the new or reconfigured mesh in the thermal oxidation process causing the shift of the interface 11.

In the step 36, the set of algebraic equations (not shown here) including the volume concentrations of the phosphorus as variables are solved in such a way that the doped phosphorus is piled up into the control volume $V_{ITN}$. In this solution, the transferred distribution of the doped phosphorus is used as the initial distribution. Therefore, the set of algebraic equations are readily solved.

In the step 37, the transition region 23 of Si is converted to $SiO_2$, resulting in the resultant profile shown in FIGS. 7B, 8E, and 8F. As clearly seen from FIG. 7B, the pileup region 15 is shifted to be the pileup region 15'. Due to the shift of the initial interface 11 and the pileup region 15, the remaining part 14 of $SiO_2$ region 13 is expanded to be the $SiO_2$ region 14' and at the same time, the Si region 16 is shrunk to be the Si region 16', resulting in the expanded $SiO_2$, region 13'.

In the step 38, it is judged whether the present time $t_m$ is equal to the preset last time $t_{end}$ which corresponds to the diffusion time $t_{dif}$ or not. If the answer is "No", the flow is returned to the step 33 and repeats the steps 33 to 38. If the answer is "Yes", the flow or calculation is stopped. In this case, the values of the doped phosphorus concentration at the individual mesh points O3', O2', O1', IO, T, IN, S1', S2', and S3' are calculated from $t_m=0$ to $t_m=t_{end}$.

By plotting the calculated values of the doped phosphorus concentration at the individual mesh points O3', O2', O1', IO, T, IN, S1', S2', and S3' on a plane, the concentration curves or graphs are provided on the plane. This means that the diffusion phenomenon of the doped phosphorus is simulated.

With the simulation method according to the second embodiment, as described above, thermal oxidation of the phosphorus-doped $SiO_2$ and Si regions 13 and 16 accompanying the shift of the interface 11 is simulated in consideration of the pileup phenomenon of the doped phosphorus atoms without using any intermediate layer.

Also, since no intermediate layer is necessary for the process simulation, the data transfer about the result of the process simulation to a device simulator is facilitated.

Further, a process simulation including change of profile or shape of the $SiO_2$ region 13 is facilitated.

In the second embodiment, the mesh points O1', O2', O3', S1', S2', S3', I, IO, and IN are arranged one-dimensionally for the sake of simplification of description. However, it is needless to say that they may be arranged two-, or three-dimensionally, as shown in FIG. 6.

In the first and second embodiments, phosphorus is used as the dopant. However, it is needless to say that any other impurity or dopant (e.g., arsenic or antimony) may be used in the present invention if it causes the pileup phenomenon.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A simulation method of diffusion of a doped impurity, comprising the steps of:
   (a) configuring a mesh having mesh points on a simulated zone including a $SiO_2$ region and a Si region contacted therewith, thereby partitioning said simulated zone into domains;
      a first one of said mesh points being located in a $SiO_2$ region;
      a second one of said mesh points being located in a Si region;
      a third one of said mesh points being located at an interface of said $SiO_2$ and Si regions;
      said third one of said mesh points serving as a double mesh point having first and second impurity concentrations;
      said first impurity concentration representing a general impurity concentration of a first one of said domains located in said $SiO_2$ region and adjacent to said interface of said $SiO_2$ and Si regions;
      said second impurity concentration representing a general impurity concentration of a second one of said domains located in said Si region and adjacent to said interface of said $SiO_2$ and Si regions;
   (b) forming diffusion equations at said respective mesh points in such a way that said doped impurity piles up into said first one of said domains located in said $SiO_2$ region; and
   (c) solving said diffusion equations to derive a distribution of said doped impurity in said simulated zone.

2. The method as claimed in claim 1, wherein said doped impurity is one selected from the group consisting of phosphorus, arsenic, and antimony.

3. The method as claimed is claim 1, wherein said first one of said domains located in said $SiO_2$ region is apart from said interface of said $SiO_2$ and Si regions by a distance of 5 Å or less.

4. The method as claimed in claim 1, wherein rate equations are formed for the first one of the domains to cause said doped impurity to pile up in said first one of the domains;
   and wherein said rate equations are used for solving said diffusion equations in said step (c).

5. The method as claimed in claim 1, wherein said third one of said mesh points is at an interface of said first one of said domains located in said $SiO_2$ region and said second one of said domains located in said Si region.

6. A simulation method of diffusion of a doped impurity, comprising the steps of:
   (a) configuring a mesh having mesh points on a simulated zone including a $SiO_2$ region and a Si region contacted therewith, thereby partitioning said simulated zone into domains;
      a first one of said mesh points being located in a $SiO_2$ region;
      a second one of said mesh points being located in a Si region;
      a third one of said mesh points being located at an initial interface of said $SiO_2$ and Si regions;
      said third one of said mesh points serving as a double mesh point having first and second impurity concentrations;
      said first impurity concentration representing a general impurity concentration of a first one of said domains located in said $SiO_2$ region and adjacent to said initial interface of said $SiO_2$ and Si region;
      said second impurity concentration representing a general impurity concentration of a second one of said domains located in said Si region and adjacent to said initial interface of said $SiO_2$ and Si regions;
   (b) setting concentrations of said domains of said simulated zone as pre-oxidation values;
   (c) calculating a growth of said $SiO_2$ region in a given oxidizing atmosphere during a specific period, thereby finding a post-oxidation position of said initial interface of said $SiO_2$ and Si regions and a post-oxidation profile of said $SiO_2$ region;
      said initial interface of said $SiO_2$ and Si regions located at said post-oxidation position thus found being defined as a post-oxidation interface of said $SiO_2$ and Si regions;
      a part of said Si region sandwiched by said initial interface of said $SiO_2$ and Si regions and said post-oxidation interface thereof being defined as a transition region;
   (d) reconfiguring said mesh points and said domains to define a first post-oxidation mesh point located at said post-oxidation interface of said $SiO_2$ and Si regions, a first post-oxidation domain located in said transition region and adjacent to said post-oxidation interface of said $SiO_2$ and Si regions, and a second post-oxidation domain located in said Si region and adjacent to said post-oxidation interface of said $SiO_2$ and Si regions;
      said first post-oxidation mesh point serving as a double mesh point having third and fourth impurity concentrations;
      said third impurity concentration representing a general impurity concentration of said first post-oxidation domain;
      said fourth impurity concentration representing a general impurity concentration of said second post-oxidation domain;
   (e) forming diffusion equations at said respective reconfigured mesh points in such a way that said doped impurity piles up from said first one of said domains located in said SiO$_2$ region and adjacent to said initial interface of said SiO$_2$ and Si regions into said first post-oxidation domain located in said transition region and adjacent to said post-oxidation interface of said SiO$_2$ and Si regions;

(f) solving said diffusion equations to derive a distribution of said doped impurity at said respective reconfigured mesh points in said simulated zone; and (g) converting said transition region to SiO$_2$ after said step (f).

7. The method as claimed in claim 6, wherein said doped impurity is one selected from the group consisting of phosphorus, arsenic, and antimony.

8. The method as claimed in claim 6, wherein said reconfigured mesh has a second post-oxidation mesh point having a fifth impurity concentration in said transition region;

said second post-oxidation mesh point being apart from said post-oxidation interface of said SiO$_2$ and Si regions by a distance of 5 Å or less.

9. The method as claimed in claim 6, wherein rate equations are formed for said first post-oxidation domain to cause said doped impurity into said first one of said domains located in said SiO$_2$ region and adjacent to said initial interface of said SiO$_2$ and Si regions to pile up into said first post-oxidation domain;

and wherein said rate equations are used for solving said diffusion equations in said step (f).

10. The method as claimed in claim 6, wherein said first post-oxidation mesh point is at an interface of said first post-oxidation domain located in said transition region and adjacent to said post-oxidation interface of SiO$_2$ and Si regions and said second post-oxidation domain located in said Si region and adjacent to said post-oxidation interface of SiO$_2$ and Si regions.

11. A computer implemented method of simulating diffusion of a doped impurity, comprising the steps of:

(a) configuring in a computer a mesh having mesh points on a simulated zone including a SiO$_2$ region and a Si region contacted therewith, thereby partitioning said simulated zone into domains;

a first one of said mesh points being located in a SiO$_2$ region;

a second one of said mesh points being located in a Si region;

a third one of said mesh points being located at an interface of said SiO$_2$ and Si regions;

said third one of said mesh points serving as a double mesh point having first and second impurity concentrations;

said first impurity concentration representing a general impurity concentration of a first one of said domains located in said SiO$_2$ region and adjacent to said interface of said SiO$_2$ and Si regions;

said second impurity concentration representing a general impurity concentration of a second one of said domains located in said Si region and adjacent to said interface of said SiO$_2$ and Si region;

(b) forming diffusion equations at said respective mesh points in such a way that said doped impurity piles up into said first one of said domains located in said SiO$_2$; and (c) solving said diffusion equations using the computer to derive a distribution of said doped impurity in said simulated zone.

12. The computer implemented method as claimed in claim 11, wherein said doped impurity is one selected from the group consisting of phosphorus, arsenic, and antimony.

13. The computer implemented method as claimed in claim 11, wherein said first one of said domains located in said SiO$_2$ region is apart from said interface of said SiO$_2$ and Si regions by a distance of 5 Å or less.

14. The computer implemented method as claimed in claim 11, wherein rate equations are formed for the first one of the domains to cause said doped impurity to pile up in said first one of the domains;

and wherein said rate equations are used for solving said diffusion equations in said step (c).

15. The method as claimed in claim 11, wherein said third one of said mesh points is at an interface of said first one of said domains located in said SiO$_2$ region and said second one of said domains located in said Si region.

16. A computer implemented method of simulating diffusion of a doped impurity, comprising the steps of:

(a) configuring in a computer a mesh having mesh points on a simulated zone including a SiO$_2$ region and a Si region contacted therewith, thereby partitioning said simulated zone into domains;

a first one of said mesh points being located in a SiO$_2$ region;

a second one of said mesh points being located in a Si region;

a third one of said mesh points being located at an initial interface of said SiO$_2$ and Si region;

said third one of said mesh points serving as a double mesh point having first and second impurity concentrations;

said first impurity concentration representing a general impurity concentration of a first one of said domains located in said SiO$_2$ region and adjacent to said initial interface of said SiO$_2$ and Si regions;

said second impurity concentration representing a general impurity concentration of a second one of said domains located in said Si region and adjacent to said initial interface of said SiO$_2$ and Si region;

(b) setting concentrations of said domains of said simulated zone as pre-oxidation values;

(c) calculating a growth of said SiO$_2$ region in a given oxidizing atmosphere during a specific period, thereby finding a post-oxidation position of said initial interface of said SiO$_2$ and Si regions and a post-oxidation profile of said SiO$_2$ region;

said initial interface of said SiO$_2$ and Si regions located at said post-oxidation position thus found being defined as a post-oxidation interface of said SiO$_2$ and Si regions;

a part of said Si region sandwiched by said initial interface of said SiO$_2$ and Si regions and said post-oxidation interface thereof being defined as a transition region;

(d) reconfiguring said mesh points and said domains to define a first post-oxidation mesh point located at said post-oxidation interface of said SiO$_2$ and Si regions, a first post-oxidation domain located in said transition region and adjacent to said post-oxidation interface of said SiO$_2$ and Si regions, and a second post-oxidation domain located in said Si region and adjacent to said post-oxidation interface of said SiO$_2$ and Si regions;

said first post-oxidation mesh point serving as a double mesh point having third and fourth impurity concentrations;

said third impurity concentration representing a general impurity concentration of said first post-oxidation domain;

said fourth impurity concentration representing a general impurity concentration of said second post-oxidation domain;

(e) forming diffusion equations at said respective reconfigured mesh points in such a way that said doped impurity piles up from said first one of said domains located in $SiO_2$ region and adjacent to said initial interface of said $SiO_2$ and Si regions into said first post-oxidation domain located in said transition region and adjacent to said post-oxidation interface of said $SiO_2$ and Si regions;

(f) solving said diffusion equations using the computer to derived a distribution of said doped impurity at said respective reconfigured mesh points in said simulated zone; and (g) converting said transition region to $SiO_2$ after said step (f).

17. The computer implemented method as claimed in claim 16, wherein said doped impurity is one selected from the group consisting of phosphorus, arsenic, and antimony.

18. The computer implemented method as claimed in claim 16, wherein said reconfigured mesh has a second post-oxidation mesh point having a fifth impurity concentration in said transition region;

said second post-oxidation mesh point being apart from said post-oxidation interface of said $SiO_2$ and Si regions by a distance of 5 Å or less.

19. The computer implemented method as claimed in claim 16, wherein rate equation are formed for said first post-oxidation domain to cause said doped impurity into said first one of said domains located in said $SiO_2$ region and adjacent to said initial interface of said $SiO_2$ and Si regions to pile up into said first post-oxidation domain;

and wherein said rate equations are used for solving said diffusion equations in said step (f).

20. The method as claimed in claim 16, wherein said first post-oxidation mesh point is at an interface of said first post-oxidation domain located in said transition region and adjacent to said post-oxidation interface of $SiO_2$ and Si regions and said second post-oxidation domain located in said Si region and adjacent to said post-oxidation interface of $SiO_2$ and Si regions.

* * * * *

UNITED STATES PATENT AND TRADEMARK OFFICE
CERTIFICATE OF CORRECTION

PATENT NO. : 6,154,717
DATED : November 28, 2000
INVENTOR(S) : Shigetaka Kumashiro Page 1 of 5

It is certified that error appears in the above-identified patent and that said Letters Patent is hereby corrected as shown below:

<u>Column 2,</u>
Line 20, delete "ponits" insert -- points --

<u>Column 3,</u>
Lines 5-18, equations 2a, 2b, 2c, 2d, and 2e, delete $$\frac{C_{O2}^m - C_{O2}^{m-1}}{\Delta t_m} = 2F_{O12} - \frac{F_{O23}}{d_{O23} + d_{O12}} \quad (2a)$$

$$\frac{C_{O1}^m - C_{O1}^{m-1}}{\Delta t_m} = 2F_{IO} - \frac{F_{O12}}{d_{O12} + d_{O1}} \quad (2b)$$

$$\frac{C_I^m - C_I^{m-1}}{\Delta t_m} = 2F_{IS} - \frac{F_{IO}}{d_{O1} + d_{IS}} \quad (2c)$$

$$\frac{C_{S1}^m - C_{S1}^{m-1}}{\Delta t_m} = 2F_{S12} - \frac{F_{IS}}{d_{IS} + d_{S12}} \quad (2d)$$

$$\frac{C_{S2}^m - C_{S2}^{m-1}}{\Delta t_m} = 2F_{S23} - \frac{F_{S12}}{d_{S12} + d_{S23}} \quad (2e)$$

"

And insert --

$$\frac{C_{O2}^m - C_{O2}^{m-1}}{\Delta t_m} = 2\frac{F_{O12} - F_{O23}}{d_{O23} + d_{O12}} \quad (2a)$$

$$\frac{C_{O1}^m - C_{O1}^{m-1}}{\Delta t_m} = 2\frac{F_{IO} - F_{O12}}{d_{O12} + d_{O1}} \quad (2b)$$

$$\frac{C_I^m - C_I^{m-1}}{\Delta t_m} = 2\frac{F_{IS} - F_{IO}}{d_{O1} + d_{IS}} \quad (2c)$$

$$\frac{C_{S1}^m - C_{S1}^{m-1}}{\Delta t_m} = 2\frac{F_{S12} - F_{IS}}{d_{IS} + d_{S12}} \quad (2d)$$

$$\frac{C_{S2}^m - C_{S2}^{m-1}}{\Delta t_m} = 2\frac{F_{S23} - F_{S12}}{d_{S12} + d_{S23}} \quad (2e)$$

--

UNITED STATES PATENT AND TRADEMARK OFFICE
CERTIFICATE OF CORRECTION

PATENT NO. : 6,154,717
DATED : November 28, 2000
INVENTOR(S) : Shigetaka Kumashiro It is certified that error appears in the above-identified patent and that said Letters Patent is hereby corrected as shown below:

Column 3 cont'd,
Lines 53-55, equation 4a and 4b, delete $$F_{oij} = -D_O C_{Oj}^m - \frac{C_{Oi}^m}{d_{Oij}} \quad (4a)$$

$$F_{sij} = -D_S C_{Si}^m - \frac{C_{Si}^m}{d_{Sij}} \quad (4b)$$

",

And insert --

$$F_{oij} = -D_O \frac{C_{Oj}^m - C_{Oi}^m}{d_{oij}} \quad (4a)$$

$$F_{sij} = -D_S \frac{C_{Si}^m - C_{Si}^m}{d_{sij}} \quad (4b)$$

--

Lines 64-65, equations 5a and 5b, delete $$F_{IO} = a_{OI}(C_{I\,max} - C_I^m)C_{O1}^m - e_{iO}C_I^m \quad (5a)$$
$$F_{IS} = a_{SI}(C_{I\,max} - C_I^m)C_{S1}^m - e_{iS}C_I^m \quad (5b)$$

", and insert --

$$F_{IO} = a_{OI}\left(C_{I\,max} - C_I^m\right)C_{O1}^m - e_{io}C_I^m \quad (5a)$$

$$F_{IS} = a_{SI}\left(C_{I\,max} - C_I^m\right)C_{S1}^m - e_{iS}C_I^m \quad (5b)$$

--

UNITED STATES PATENT AND TRADEMARK OFFICE
CERTIFICATE OF CORRECTION

PATENT NO. : 6,154,717
DATED : November 28, 2000
INVENTOR(S) : Shigetaka Kumashiro It is certified that error appears in the above-identified patent and that said Letters Patent is hereby corrected as shown below:

Column 12,
Lines 9-23, equations 7a, 7b, 7c, 7d, 7e and 7f, delete $$\frac{C_{O2}^m - C_{O2}^{m-1}}{\Delta t_m} = 2F_{O12} - \frac{F_{O23}}{d_{O23} + d_{O12}} \quad (7a)$$

$$\frac{C_{O1}^m - C_{O1}^{m-1}}{\Delta t_m} = 2F_{O1} - \frac{F_{O12}}{d_{O12} + d_{O1}} \quad (7b)$$

$$\frac{C_{IO}^m - C_{IO}^{m-1}}{\Delta t_m} = 2F_I - \frac{F_{IO}}{d_{O1}} \quad (7c)$$

$$\frac{C_{IS}^m - C_{IS}^{m-1}}{\Delta t_m} = 2F_{IS} - \frac{F_I}{d_{IS}} \quad (7d)$$

$$\frac{C_{S1}^m - C_{S1}^{m-1}}{\Delta t_m} = 2F_{S12} - \frac{F_{IS}}{d_{IS} + d_{S12}} \quad (7e)$$

$$\frac{C_{S2}^m - C_{S2}^{m-1}}{\Delta t_m} = 2F_{S23} - \frac{F_{S12}}{d_{S12} + d_{S23}} \quad (7f)$$

"

and insert --

$$\frac{C_{O2}^m - C_{O2}^{m-1}}{\Delta t_m} = 2\frac{F_{O12} - F_{O23}}{d_{O23} + d_{O12}} \quad (7a)$$

$$\frac{C_{O1}^m - C_{O1}^{m-1}}{\Delta t_m} = 2\frac{F_{O1} - F_{O12}}{d_{O12} + d_{O1}} \quad (7b)$$

$$\frac{C_{IO}^m - C_{IO}^{m-1}}{\Delta t_m} = 2\frac{F_I - F_{O1}}{d_{O1}} \quad (7c)$$

$$\frac{C_{IS}^m - C_{IS}^{m-1}}{\Delta t_m} = 2\frac{F_{IS} - F_I}{d_{IS}} \quad (7d)$$

$$\frac{C_{S1}^m - C_{S1}^{m-1}}{\Delta t_m} = 2\frac{F_{S12} - F_{IS}}{d_{IS} + d_{S12}} \quad (7e)$$

$$\frac{C_{S2}^m - C_{S2}^{m-1}}{\Delta t_m} = 2\frac{F_{S23} - F_{S12}}{d_{S12} + d_{S23}} \quad (7f)$$

--

UNITED STATES PATENT AND TRADEMARK OFFICE
CERTIFICATE OF CORRECTION

PATENT NO. : 6,154,717
DATED : November 28, 2000
INVENTOR(S) : Shigetaka Kumashiro It is certified that error appears in the above-identified patent and that said Letters Patent is hereby corrected as shown below:

Column 12 cont'd,
Lines 44-50, equations 8a, 8b and 8c, delete "

$$F_{Oij} = -D_O C_{Oj}^m - \frac{C_{Oi}^m}{d_{Oij}} \quad (8a)$$

$$F_{IS} = -D_S C_{Sl}^m - \frac{C_{IS}^m}{d_{IS}} \quad (8b)$$

$$F_{Sij} = -D_S C_{Sj}^m - \frac{C_{Si}^m}{d_{Sij}} \quad (8c)$$

"

and insert --

$$F_{Oij} = -D_O \frac{C_{Oj}^m - C_{Oi}^m}{d_{Oij}} \quad (8a)$$

$$F_{IS} = -D_S \frac{C_{SI}^m - C_{IS}^m}{d_{IS}} \quad (8b)$$

$$F_{Sij} = -D_S \frac{C_{Sj}^m - C_{Si}^m}{d_{Sij}} \quad (8c)$$

--

Lines 60-61, equations 9a and 9b, delete $$F_{OI} = a_O(C_{Imax} - C_{IO}^m)C_{OI}^m - e_O C_{IO}^m \quad (9a)$$

$$F_I = a_S(C_{Imax} - C_{IO}^m)C_{IS}^m - e_S C_{IO}^m \quad (9b)$$

"

and insert --

$$F_{OI} = a_O(C_{Imax} - C_{IO}^m)C_{OI}^m - e_o C_{IO}^m \quad (9a)$$

$$F_I = a_s(C_{Imax} - C_{IO}^m)C_{IS}^m - e_s C_{IO}^m \quad (9b)$$

--

UNITED STATES PATENT AND TRADEMARK OFFICE
CERTIFICATE OF CORRECTION

PATENT NO. : 6,154,717
DATED : November 28, 2000
INVENTOR(S) : Shigetaka Kumashiro It is certified that error appears in the above-identified patent and that said Letters Patent is hereby corrected as shown below:

<u>Column 15,</u>
Line 32, delete "contorl" insert -- control --

<u>Column 19,</u>
Lines 24-33, equations 14a, 14b, 14c and 14d, delete "

$$\frac{C_{IOO}^m - C_{IOO}^{m-1}}{\Delta t_m} = 2F_{IO} - \frac{F_{OIO}}{d_{OI}} \quad (14a)$$

$$\frac{C_{ITO}^m - C_{ITO}^{m-1}}{\Delta t_m} = 2F_T - \frac{F_{IO}}{d_T} \quad (14b)$$

$$\frac{C_T^m - C_T^{m-1}}{\Delta t_m} = 2F_{TIN} - \frac{F_T}{d_T + d_{IN}} \quad (14c)$$

$$\frac{C_{ITN}^m - C_{ITN}^{m-1}}{\Delta t_m} = 2F_{IN} - \frac{F_{TIN}}{d_{IN}} \quad (14d)$$

"

And insert --

$$\frac{C_{IOO}^m - C_{IOO}^{m-1}}{\Delta t_m} = 2\frac{F_{IO} - F_{OIO}}{d_{OI}} \quad (14a)$$

$$\frac{C_{ITO}^m - C_{ITO}^{m-1}}{\Delta t_m} = 2\frac{F_T - F_{IO}}{d_T} \quad (14b)$$

$$\frac{C_T^m - C_T^{m-1}}{\Delta t_m} = 2\frac{F_{TIN} - F_T}{d_T + d_{IN}} \quad (14c)$$

$$\frac{C_{ITN}^m - C_{ITN}^{m-1}}{\Delta t_m} = 2\frac{F_{IN} - F_{TIN}}{d_{IN}} \quad (14d)$$

--

Signed and Sealed this

Twentieth Day of May, 2003

JAMES E. ROGAN
*Director of the United States Patent and Trademark Office*